(12) United States Patent
Shinbata

(10) Patent No.: US 7,013,035 B2
(45) Date of Patent: *Mar. 14, 2006

(54) IMAGE PROCESSING METHOD FOR SETTING AN EXTRACTION AREA, AND APPARATUS AND RECORDING MEDIUM

(75) Inventor: Hiroyuki Shinbata, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 09/405,176

(22) Filed: Sep. 24, 1999

(65) Prior Publication Data

US 2003/0169912 A1    Sep. 11, 2003

(30) Foreign Application Priority Data

| Sep. 25, 1998 | (JP) | ................................. 10-272284 |
| Nov. 30, 1998 | (JP) | ................................. 10-339874 |
| Sep. 17, 1999 | (JP) | ................................. 11-264447 |

(51) Int. Cl.
*G06K 9/00* (2006.01)

(52) U.S. Cl. ...................... 382/132; 382/174; 358/521
(58) Field of Classification Search ................ 382/174, 382/132, 128, 173, 190, 199; 378/70.82, 378/86.87, 98.4
See application file for complete search history.

(56) References Cited

U.S. PATENT DOCUMENTS

| 4,873,437 A | * | 10/1989 | Nakajima ..................... 250/587 |
| 5,268,967 A | * | 12/1993 | Jang et al. ................... 382/132 |
| 5,680,471 A | * | 10/1997 | Kanebako et al. ........... 382/128 |
| 5,732,149 A | * | 3/1998 | Kido et al. ............... 250/492.1 |
| 5,748,775 A | * | 5/1998 | Tsuchikawa et al. ......... 382/170 |
| 5,864,779 A | * | 1/1999 | Fujimoto ..................... 382/168 |
| 6,011,862 A | * | 1/2000 | Doi et al. .................... 382/132 |
| 6,035,064 A | * | 3/2000 | Nakao et al. ................ 382/174 |
| 6,335,980 B1 | * | 1/2002 | Armato et al. ............... 382/132 |

OTHER PUBLICATIONS

U.S. Appl. No. 09/287,406.*

* cited by examiner

*Primary Examiner*—Samir Ahmed
*Assistant Examiner*—Charles Kim
(74) *Attorney, Agent, or Firm*—Fitzpatrick, Cella, Harper & Scinto

(57) ABSTRACT

An image processing method for extracting a characteristic amount of a photographed image from the photographed image obtained by photographing an object, comprises a passing through deleting step of deleting a passing through area from the photographed image, a preparing step of preparing a projection from the image from which the passing through area is deleted, and a setting step of setting a characteristic area of said photographed image based on a result of the projection.

8 Claims, 23 Drawing Sheets

CHARACTERISTIC EXTRACTING CIRCUIT 114

FIG. 18
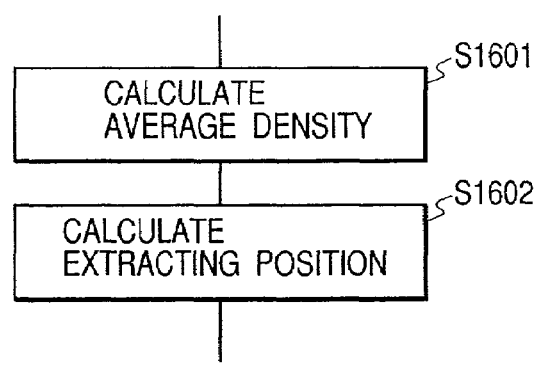
FIG. 19A   FIG. 19B   FIG. 19C
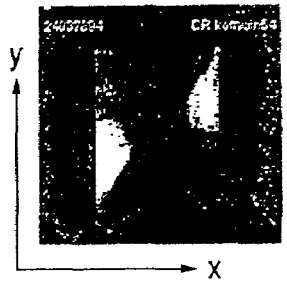 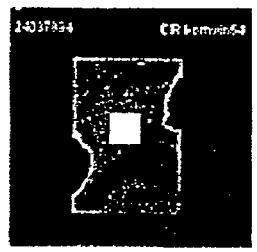 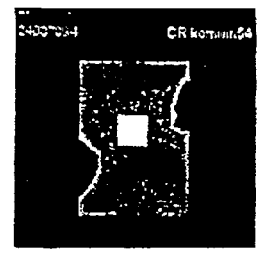
FIG. 20A   FIG. 20B   FIG. 20C
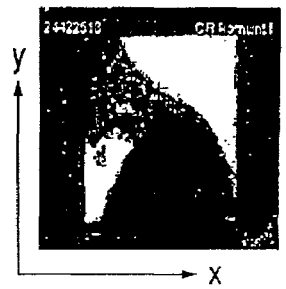 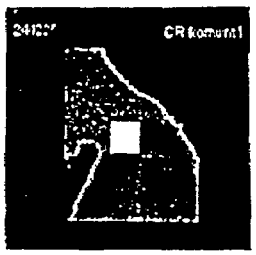 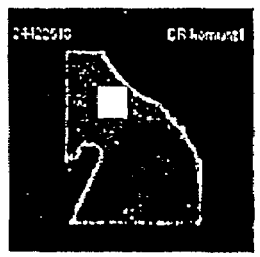

AVERAGE PIXEL
VALUE f(y)

FIG. 28A
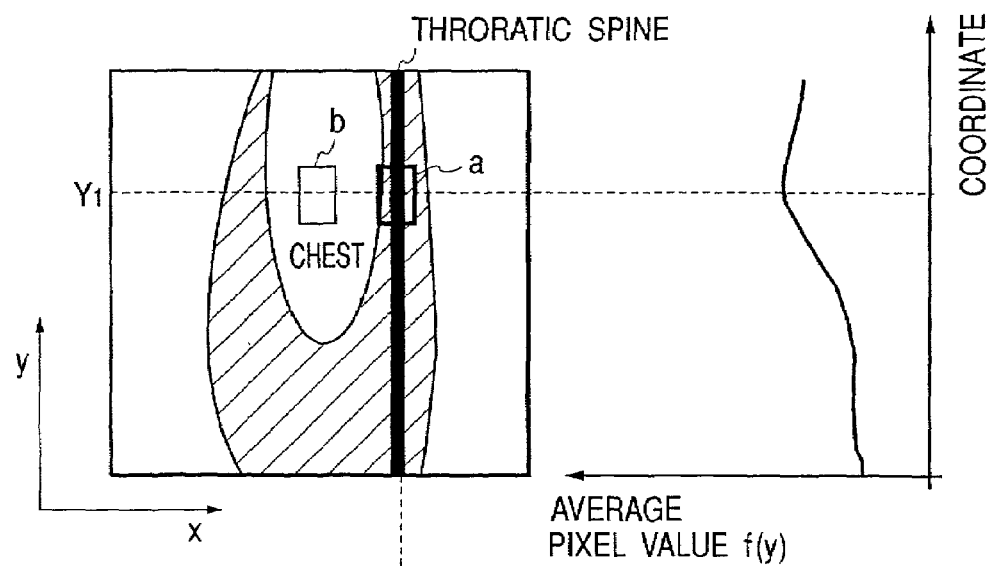
FIG. 28B
FIG. 28C
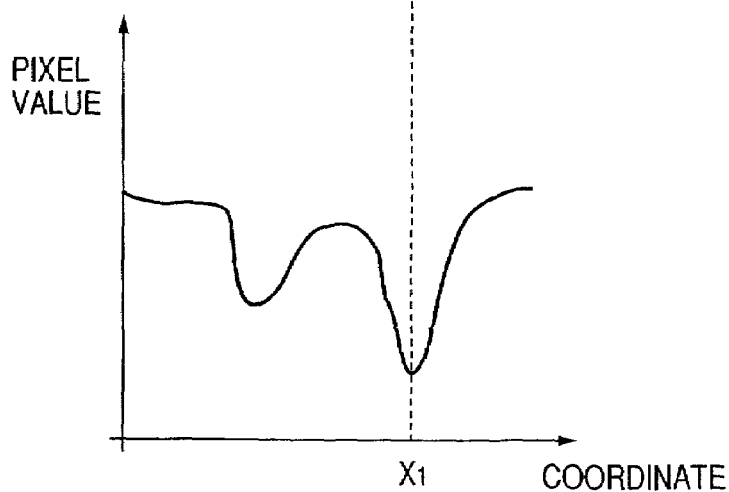

IMAGE PROCESSING METHOD FOR SETTING AN EXTRACTION AREA, AND APPARATUS AND RECORDING MEDIUM

BACKGROUND OF THE INVENTION

1. Field of the Invention

The present invention relates to a constitution which performs a processing of an image for medical purposes.

2. Related Background Art

In recent years, with the advancement in digital techniques, there has been performed a processing, for example, which comprises: receiving radiation (X rays, and the like) by a sensor via an object; digitizing a resulting radiation image; performing a predetermined image processing on a digital image; and transmitting an output to a monitor, or a film for X-ray diagnosis.

Examples of the image processing include a gradation conversion processing in which gradation conversion is performed in accordance with density distribution of an original image obtained by radiographing. By the gradation conversion processing, the image obtained by the radiographing is converted to a density value which is easily observed, and outputs are transmitted to the monitor, the film, and the like.

For example, FIG. 29 shows an X-ray image 600 which is obtained by X-ray photographing of a cervical vertebra front part. In FIG. 29, an area 601 (black portion) shows a head part, and the other area 602 shows a throat part.

Here, when the X-ray image 600 is outputted to the film for X-ray diagnosis, first, a characteristic amount of the X-ray image 600 is extracted. In this case, in a method of extracting the characteristic amount, as shown in FIG. 30, used is a histogram of a remaining area which is obtained by deleting a passing through area (area in which X rays are directly radiated to the sensor) from the X-ray image 600. In FIG. 30, abscissa shows pixel value, and ordinate shows output frequency. Therefore, in the histogram, the pixel value (x) of a lower portion, for example, a constant portion (low density portion) point such as 5% point is extracted as the characteristic amount, and the density value of the X-ray image 600 is converted so that the extracted pixel value (x) reaches a density value of about 1.0 on the film.

However, in the above-described conventional characteristic amount extracting method, the pixel value around the low density portion at most is merely extracted as the characteristic amount for use in the gradation conversion processing. Specifically, the portion from which the characteristic amount is extracted is not necessarily stable. Therefore, when the characteristic amount obtained in the conventional method is used to perform the gradation conversion processing on the photographed image, there arises a problem that the density value is dispersed in the film or the like for each photographed image. This deteriorates the image quality of the processed image.

SUMMARY OF THE INVENTION

An object of the present invention is that a characteristic area of photographed image can highly precisely be set.

To attain this object, according to the present invention, there is provided an image processing method for extracting a characteristic amount of a photographed image from the photographed image obtained by photographing an object, comprising:

a passing through deleting step of deleting a passing through area from the photographed image;

a preparing step of preparing a projection from the image from which the passing through area is deleted; and a setting step of setting a characteristic area of the photographed image based on a result of the projection.

There is also provided an image processing method for extracting a characteristic amount of a photographed image from the photographed image obtained by photographing an object, comprising:

a preparing step of preparing an outside outline of the object from the photographed image;

a first setting step of setting a characteristic area of the photographed image from the outside outline;

an analyzing step of analyzing a density distribution of the photographed image;

a second setting step of setting the characteristic area of the photographed image from the density distribution; and a third setting step of setting the characteristic area in the photographed image based on a result of the first setting step and/or a result of the second setting step.

There is further provided an image processing method for extracting a characteristic amount of a photographed image from the photographed image obtained by photographing an object, comprising:

a passing through deleting step of deleting a passing through area from the photographed image;

a calculating step of calculating an average pixel value of a predetermined axis direction from the image from which the passing through area is deleted; and a setting step of setting a characteristic area of the photographed image based on a shape of a result of the calculating step.

Another object of the present invention is that by performing gradation conversion in accordance with a characteristic amount obtained from a highly precisely set characteristic area, an excellent gradation conversion can be realized.

To attain this object, the image processing method of the present invention further comprises a step of using the characteristic amount for the characteristic area to perform a gradation conversion processing.

The present invention will be illustrated hereinafter by way of example, and not by way of limitation.

BRIEF DESCRIPTION OF THE DRAWINGS

FIG. 18 is a flowchart showing the flow of a second analysis processing;

FIGS. 19A, 19B and 19C are constitution diagrams showing a cervical vertebra side view and a processed image;

FIGS. 20A, 20B and 20C are constitution diagrams showing the cervical vertebra side view and the processed image;

FIGS. 28A, 28B and 28C are diagrams showing a relation of a throratic spine image, an average pixel value and a profile;

DETAILED DESCRIPTION OF THE PREFERRED EMBODIMENTS

Embodiments of the present invention will be described hereinafter with reference to the drawings.

(First Embodiment)

Figure 1:
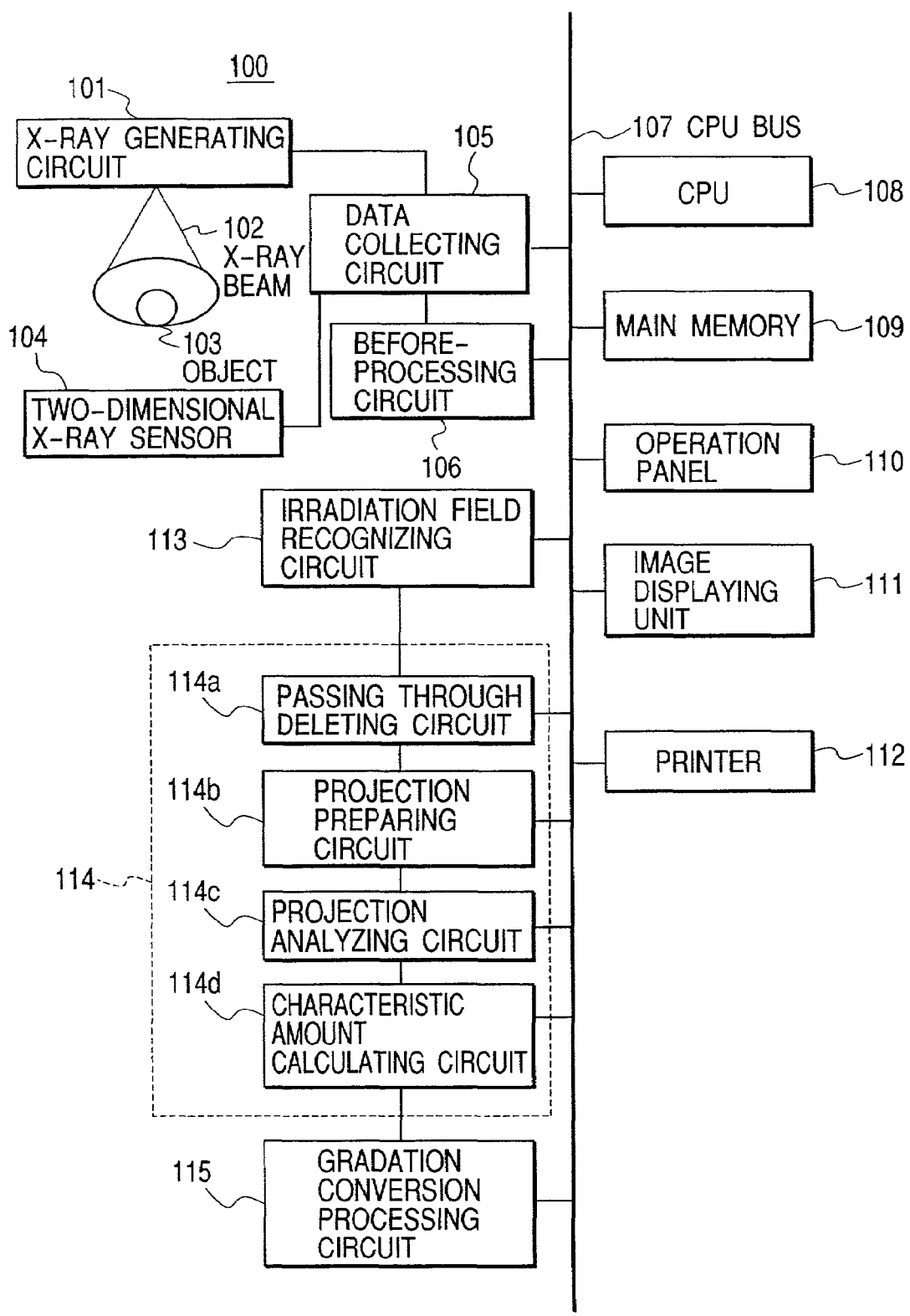
FIG. 1 is a block diagram showing one constitution example of an X-ray photographing device.

The present invention is applied, for example, to an image processing device 100 as shown in FIG. 1.

The image processing device 100 is an X-ray image processing device having a gradation conversion processing function (density value converting function), and is provided, as shown in FIG. 1, with a data collecting circuit 105, a before-processing circuit 106, an irradiation field recognizing circuit 113, a characteristic amount extracting circuit 114, a gradation conversion processing circuit 115, a CPU 108, a main memory 109, an operation panel 110, an image displaying unit 111, and a printer 112. These constituting components exchange data via a CPU bus 107.

Moreover, the image processing device 100 is provided with an X-ray generating circuit 101 and a two-dimensional X-ray sensor 104. Additionally, the X-ray generating circuit 101 and two-dimensional X-ray sensor 104 are connected to the data collecting circuit 105, and an X-ray beam 102 radiated from the X-ray generating circuit 101 is incident upon the two-dimensional X-ray sensor 104 via an object to be tested (object) 103.

Figure 3:
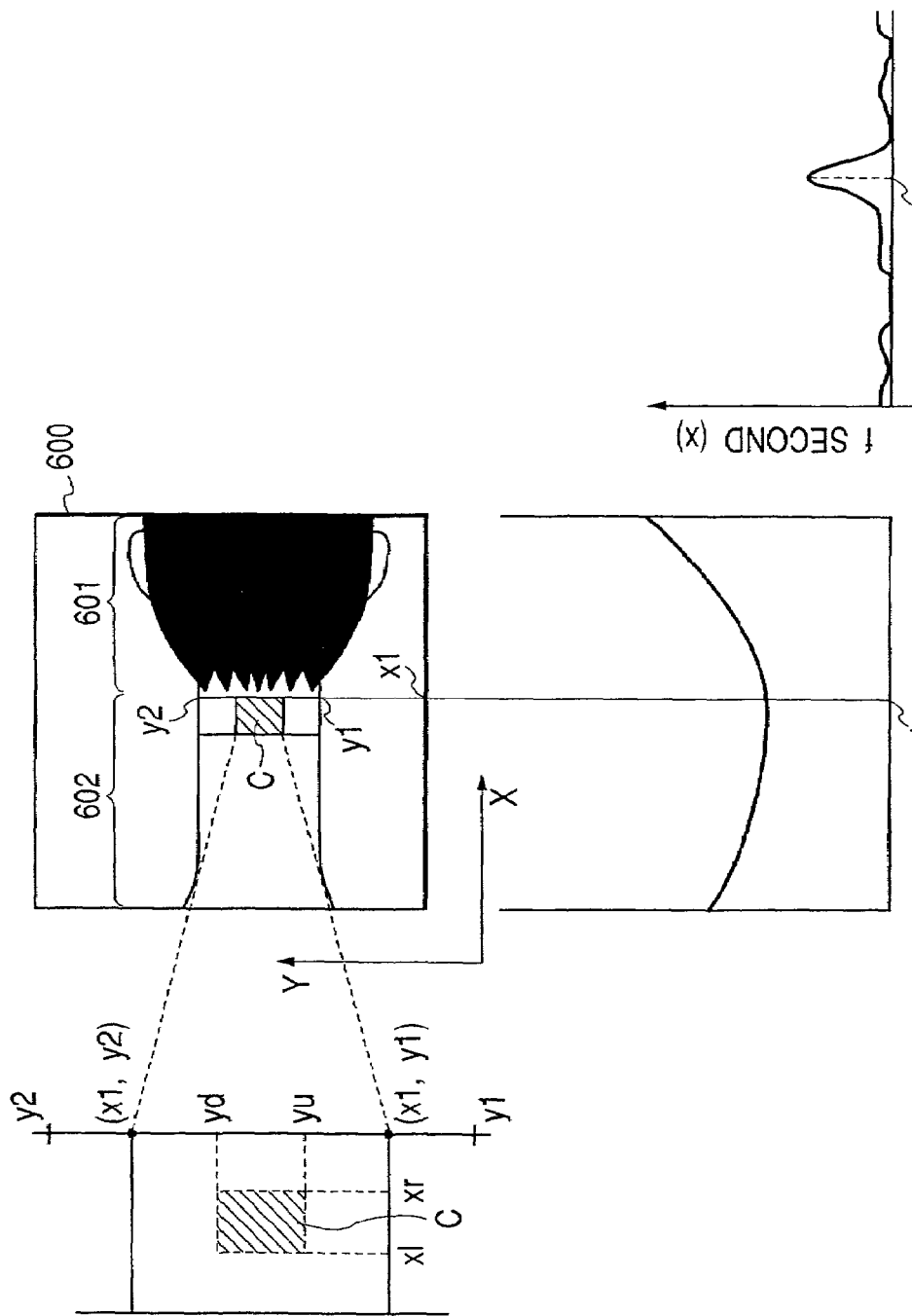
FIGS. 3A and 3B are explanatory views of a projection obtained in the characteristic amount extracting circuit.

Here, in the embodiment, a cervical vertebra front part is X-ray photographed by the image processing device 100 to obtain an image 600 as shown in FIG. 3, and the characteristic amount of the image 600 is extracted. For example, as an area from which the characteristic amount is to be extracted, the vicinity of a bone area of a throat 602 is used, and the pixel value of the area is extracted as the characteristic amount (density characteristic amount). This is because it has been experimentally found that when the pixel value of the vicinity of the bone area of throat 602 is used as the characteristic amount to perform a gradation conversion processing, a stable gradation characteristic can be obtained.

Additionally, since an area 601 (black portion) is inferior in X-ray transmittance, obtained data has a lower pixel value as compared with data of the throat part and passing through part (in this case, a portion having a low X-ray transmittance is regarded as low density, and a portion having a high X-ray transmittance is regarded as high density. Even in a converse case, it is easy for a person skilled in the art to change formula).

Additionally, in the image processing device 100, processing programs necessary for various processings in the CPU 108, various data, and the like are stored in the main memory 109. Moreover, the main memory 109 also includes a work memory for the operation of the CPU 108. Then, the CPU 108 reads the processing program stored in the main memory 109 and executes the program to perform an operation control of the entire device according to the operation in the operation panel 110. Thereby, the image processing device 100 operates as follows:

First, when a user gives an instruction to start photographing in the operation panel 110, the X-ray generating circuit 101 radiates the X-ray beam 102 to the object 103.

The X-ray beam 102 radiated from the X-ray generating circuit 101 is attenuated and transmitted through the object 103 to reach the two-dimensional X-ray sensor 104.

The two-dimensional X-ray sensor 104 converts the X-ray beam 102 transmitted through the object 103 from the X-ray generating circuit 101 into an electric signal, and outputs the signal as X-ray image data of the object 103.

The data collecting circuit 105 digitizes the X-ray image signal outputted from the two-dimensional X-ray sensor 104 and supplies the signal to the before-processing circuit 106.

The before-processing circuit 106 performs an offset correction processing, a gain correction processing, and other pre-processings on the X-ray image data from the data collecting circuit 105.

The X-ray image data subjected to the pre-processing in the before-processing circuit 106 is, by control of CPU 108, transmitted via the CPU bus 107, once stored in the main memory 109, then supplied to the irradiation field recognizing circuit 113.

The irradiation field recognizing circuit (irradiation field area extracting circuit) 113 extracts the irradiation field area (area in which so-called "irradiation regulation" is performed by irradiating only the necessary area to prevent scattering from an unnecessary area and to prevent contrast from lowering in a photographing area) of the input image data supplied via the CPU bus 107. The irradiation field area obtained by the irradiation field recognizing circuit 113 is, by the control of CPU 108, supplied to the characteristic amount extracting circuit 114 via the CPU bus 107.

The characteristic amount extracting circuit 114 is a circuit for extracting the characteristic amount of input image, and is provided with a passing through deleting circuit 114a for deleting a passing through area and a field area contacting the passing through area over a constant width from the irradiation field area obtained by the irradiation field recognizing circuit 113; a projection preparing circuit 114b for preparing a projection from image data of the area other than the area subjected to the passing through deleting processing by the passing through deleting circuit 114a; a projection analyzing circuit 114c for analyzing the area to extract the characteristic amount (density characteristic amount) therefrom from the shape of the projection prepared by the projection preparing circuit 114b; and a characteristic amount calculating circuit 114d for calculating the characteristic amount in accordance with analysis result of the projection analyzing circuit 114c.

Additionally, the characteristic amount calculated by the characteristic amount calculating circuit 114d is supplied to the gradation conversion processing circuit 115, in which a gradation conversion processing is performed on the input image data based on the characteristic amount.

The operation of the characteristic amount extracting circuit 114 will be described hereinafter in detail with reference to a flowchart shown in FIG. 2.

First, the irradiation field recognizing circuit 113 disposed before the characteristic amount extracting circuit 114 obtains the input image data stored in the main memory 109 by the control of CPU 108, and extracts the irradiation field area in the input image data (step S200).

Subsequently, in the characteristic amount extracting circuit 114, the passing through deleting circuit 114a replaces the pixel value of the area outside the irradiation field area extracted by the irradiation field recognizing circuit 113, the passing through area in the irradiation field area, or the field area contacting the passing through area within a predetermined interval, for example, with "0" (step S201).

In the passing through deleting circuit 114a, processed image data f1(x, y) is represented by equation (1).

$$f1(x,y) = f(x,y) \times \prod_{x1=-d1}^{x1=d1} \prod_{y1=-d2}^{y1=d2} sgn(x+x1, y+y1) \quad (1)$$

In the equation (1), "f(x, y)" denotes the input image data. Moreover, sgn(x, y) is represented by equation (2) with a constant Th1 determined by experiment or the like (e.g., the value is 90% of the maximum pixel value of the entire image), and constants d1, d2 for determining the constant interval width to delete the field area.

$$sgn(x,y)=0: \text{when } f(x,y) \geq Th1$$

$$sgn(x,y)=1: \text{others} \quad (2)$$

Subsequently, the projection preparing circuit 114b binarizes the pixel value which cannot be replaced with "0" in the passing through deleting circuit 114a (the pixel value in the image data f1(x, y) after the passing through deletion processing). The binarized image data f2(x, y) is represented by equations (3) and (4).

$$f2(x,y)=sgn1(x,y) \quad (3)$$

$$sgn1(x,y)=c: f1(x,y) \neq 0$$

$$sgn1(x,y)=0: \text{others} \quad (4)$$

Additionally, in the above equation (4), "c" is a constant, and is set to "1" here.

Subsequently, the projection preparing circuit 114b prepares projection f pro (x) to X-axis of the binarized image data f2(x, y) according to equation (5) (step S202).

$$f\ pro(x) = \int_0^{dy} f2(x,y)\,dy \quad (5)$$

Therefore, in the projection preparing circuit 114b, the projection f pro (x) is prepared as shown in FIG. 3A. In FIG. 3A, abscissa shows X-axis, and ordinate shows the number of pixels.

As described above, after the projection f pro (x) is prepared by the projection preparing circuit 114b, the projection analyzing circuit 114c next uses the projection f pro (x) to obtain secondary difference value f second (x), and X coordinate x1 in which the secondary difference value f second (x) reaches a maximum value by equations (6) and (7) (steps S203, S204).

$$f\ second(x) = f\ pro(x+d1) - 2 \times f\ pro(x) - f\ pro(x-d1) \quad (6)$$

$$x1 = \max\{f\ second(x) \mid 0 \leq x \leq dx\} \quad (7)$$

In the equations (6) and (7), "d1" denotes a difference distance (set to "5" here), and "dx" and "dy" denote widths on X-axis and Y-axis of an image area (set to "168" here).

Therefore, in the projection analyzing circuit 114c, a shown in FIG. 3B, the secondary difference value f second (x), and the X coordinate x1 in which the secondary difference value f second (x) reaches the maximum value are obtained.

Subsequently, the projection analyzing circuit 114c obtains coordinates xr and xl on a horizontal axis of the area from which the characteristic amount is extracted (area in the vicinity of the bone area of the throat 602, that is, area C shown by slashes in FIG. 3A) by equations (8) and (9).

$$xr=x1-d3 \quad (8)$$

$$xl=x1-d4 \quad (9)$$

In the equations (8) and (9), "d3" and "d4" denote constants, and are herein set to "10" and "20".

Moreover, the projection analyzing circuit 114c obtains coordinates yu and yd on the vertical axis of the area C by equations (10) and (11) (step S205).

$$yu=y1+fpro(x1-d3)/2+d5 \quad (10)$$

$$yd=y1+fpro(x1-d3)/2-d5 \quad (11)$$

In the equations (10) and (11), "y1" and "y2" denote low end and upper end coordinates of the image area after the passing through deletion processing in X coordinate xr (=x1−d3). Additionally, the coordinates yu and yd may be coordinates y1 and y2.

Subsequently, the characteristic amount calculating circuit 114d calculates the average value of pixel values in coordinate (x1, xr, yu, yd) obtained in the projection analyzing circuit 114c, and calculation result is used as the characteristic amount (density characteristic amount) in the gradation conversion processing circuit 115 (step S206).

Additionally, the density characteristic amount calculated here may be, for example, an intermediate value in the area C.

Figure 4:
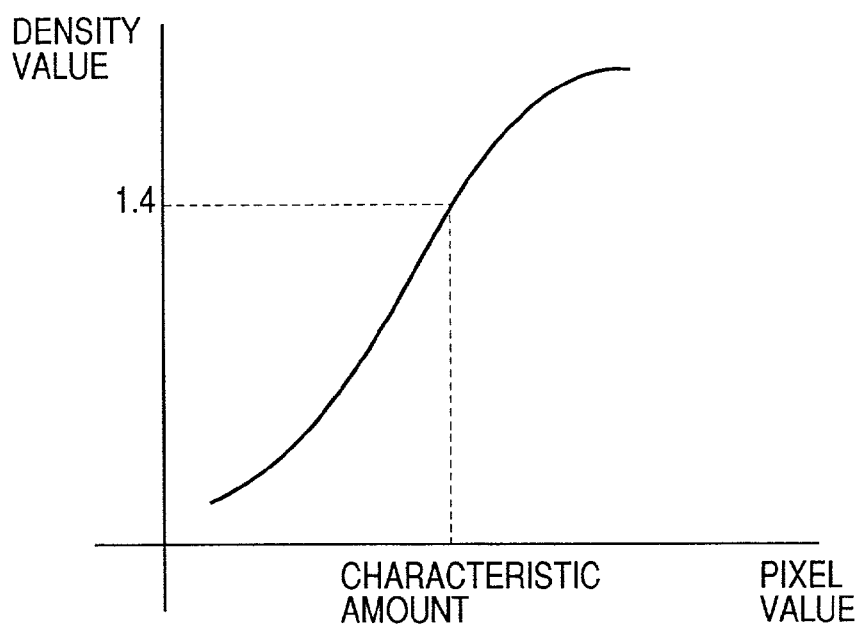
FIG. 4 is a graph showing a characteristic amount obtained by the shape of the projection.

As shown in FIG. 4, the gradation conversion processing circuit 115 converts the density value of the input image data so that the density characteristic amount obtained in the characteristic amount calculating circuit 114d indicates a density value of 1.4.

Additionally, in FIG. 4, abscissa shows the density value of the input image data, and ordinate shows the density value of output image (processed image).

The image data subjected to the gradation conversion processing in the gradation conversion processing circuit 115 is, by the control of CPU 108, displayed on a screen in the image displaying unit 111, or printed/outputted in the printer 112.

As described above, in the embodiment, the constitution comprises deleting the passing through area from the photographed image, preparing the projection of the image, and extracting the density characteristic amount from the shape of the projection, so that the density characteristic amount of the predetermined area (area C shown in FIG. 3A) can stably be extracted. Therefore, even when the density distribution of the photographed object terribly fluctuates, a stable image after the gradation conversion processing can be obtained, and an appropriate and stable image for use in diagnosis or the like can be obtained.

(Second Embodiment)

Figure 5:
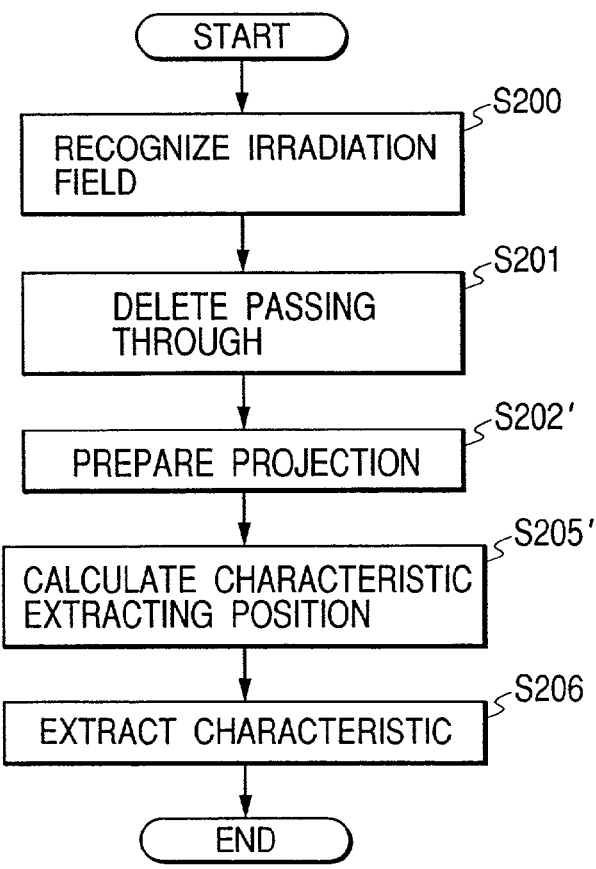
FIG. 5 is a flowchart showing the operation of the characteristic amount extracting circuit in a second embodiment.

In a second embodiment, the characteristic amount extracting circuit 114 in the first embodiment is operated, for example, as shown in the flowchart of FIG. 5.

Figure 2:
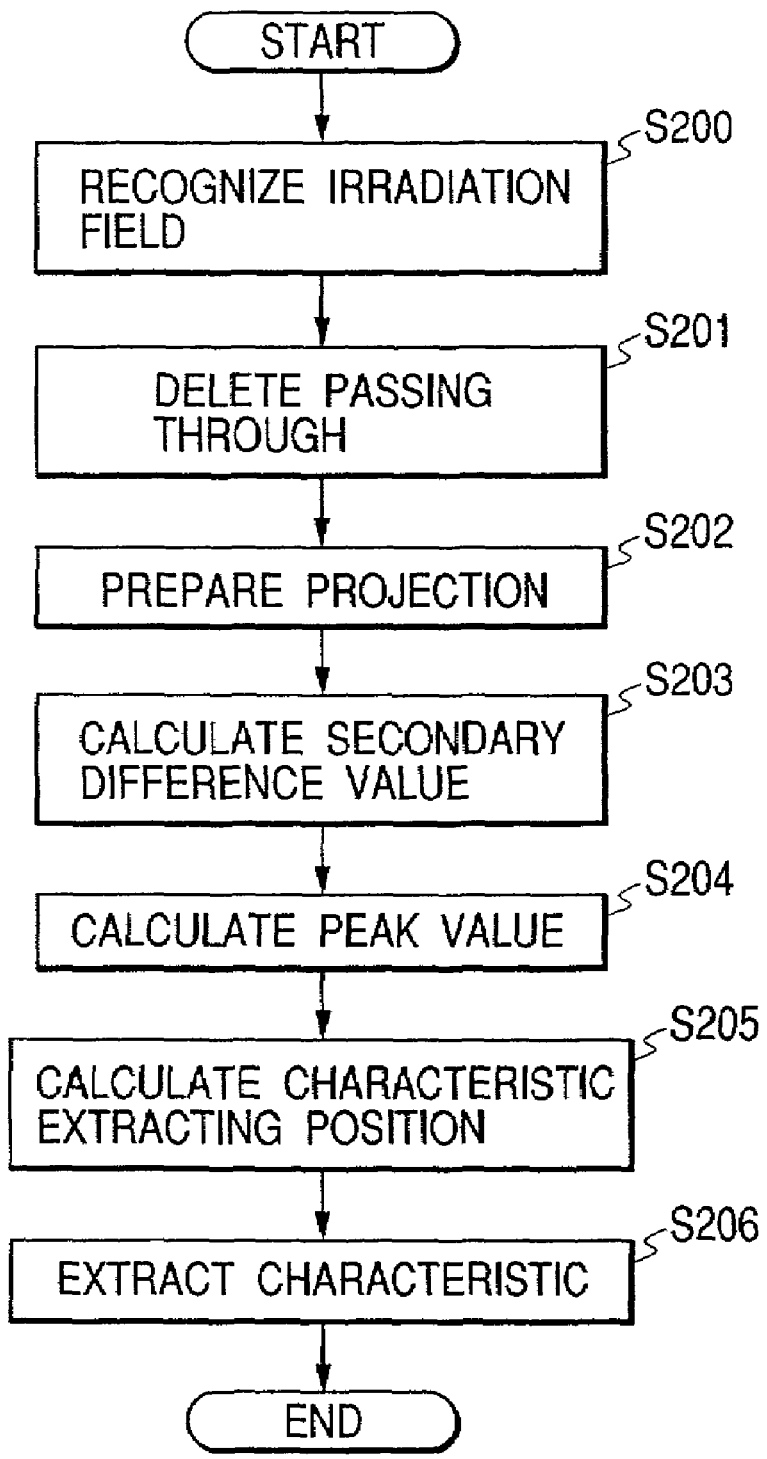
FIG. 2 is a flowchart showing the operation of a characteristic amount extracting circuit according to a first embodiment.

Additionally, in the flowchart of FIG. 5, the steps of executing processings in the same manner as in the flowchart of FIG. 2 are denoted with the same reference numerals, the detailed description thereof is omitted, and only the constitution different from that of the first embodiment will be described in detail.

First, as described above, the irradiation field recognizing circuit 113 extracts the irradiation field area from the input image data (step S200). Moreover, the passing through deleting circuit 114a deletes the area outside the irradiation field area, the passing through area in the irradiation area, and the field area contacting the passing through area with the constant width (step S201).

Figure 6B:
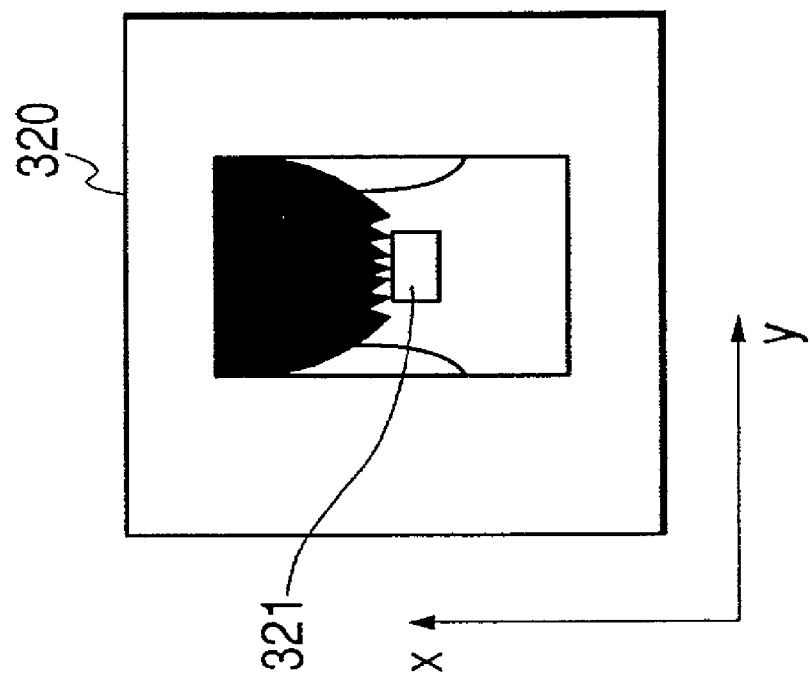
FIGS. 6A and 6B are explanatory views showing one example of a photographed image from which the characteristic amount is extracted in the characteristic amount extracting circuit.
Figure 6A:
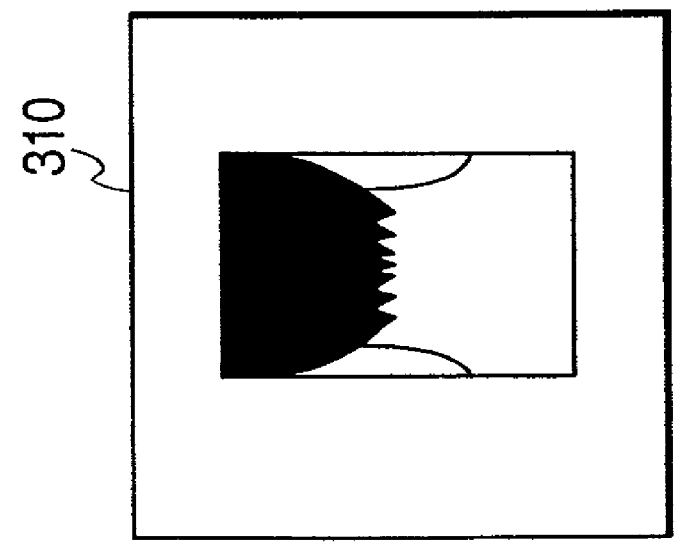

Here, for example, when the input image data comprises an image 310 of a cervical vertebra front part as shown in FIG. 6A in the same manner as the first embodiment, the image subjected to the passing through deletion processing in the passing through deleting circuit 114a turns to an image 320 as shown in FIG. 6B.

Additionally, an area 321 shown in FIG. 6B (white square portion in a central portion) indicates a characteristic amount extracting area.

Subsequently, the projection preparing circuit 114b prepares a weighting projection f pro2 (x) to X-axis of the image data f2(x, y) obtained by binarizing the pixel value which cannot be replaced with "0" in the passing through deleting circuit 114a (the pixel value in the image data f1(x, y) after the passing through deletion processing) according to equation (12) (step S202′).

$$f\ pro2(x) = \int_0^{dy} f2(x,y) \times f3(x,y)\,dy \quad (12)$$

In the equation (12), "f3(x, y)" denotes a simple decrease function of pixel value. Examples of the function include functions represented by equations (13) and (14), and the form is not limited.

$$f3(x,y)=c1/(f1(x,y)+c2) \quad (13)$$

$$f3(x,y)=(c3-f1(x,y))\times(c3-f1(x,y)) \quad (14)$$

Additionally, in the equations (13) and (14), "c1", "c2", and "c3" ($\geq$ max) denote constants, and "max" denotes the maximum pixel value which can be taken by the image.

Figure 7:
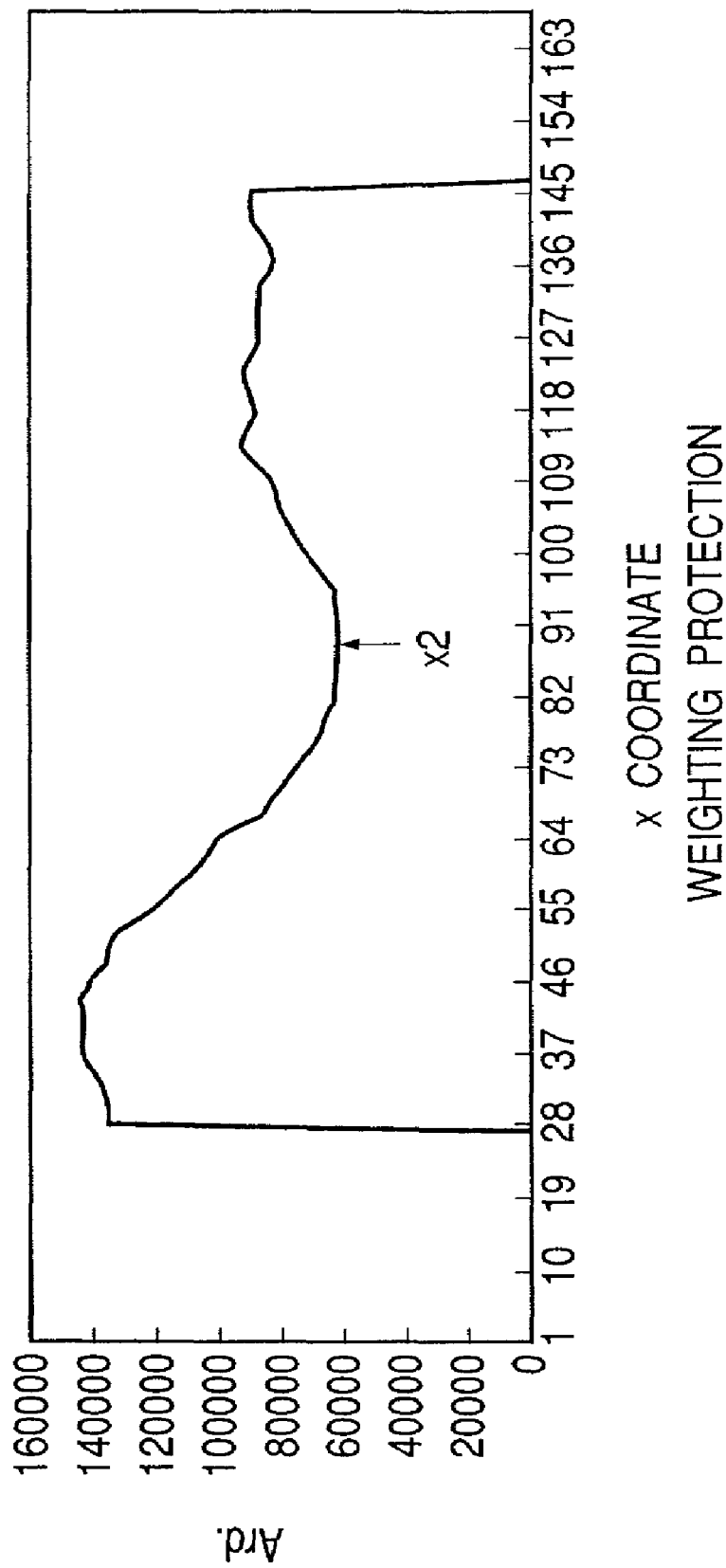
FIG. 7 is a graph showing the projection obtained in the characteristic amount extracting circuit.

Therefore, in the projection preparing circuit 114b, the weighting projection f pro2 (x) is prepared as shown in FIG. 7.

The projection analyzing circuit 114c uses the projection f pro2 (x) prepared by the projection preparing circuit 114b to obtain X coordinate x2 indicating a minimum value in which the projection f pro2 (x) is not "0" by equation (15) (step S205′).

$$x2=\min\{fpro2(x)|0\leq x\leq dx,\ \text{and}\ fpro2(x)>0\} \quad (15)$$

Therefore, the X coordinate x2 obtained in the projection analyzing circuit 114c is replaced with the X coordinate x1 in the first embodiment, the coordinate (x1, xr, yu, yd) of the characteristic amount extracting area is calculated in the same manner as the first embodiment, the average value of the pixel values in the coordinate is calculated as the density characteristic amount for use in the gradation conversion processing circuit 115, and the subsequent processing is advanced.

As described above, in the embodiment, the projection for use in extracting the characteristic amount extracting area is constituted to be the projection f pro2 (x) weighted with the pixel value. For example, in the vicinity of the low density portion such as a chin overlapping the noted area, the projection rises. Therefore, the characteristic amount extracting area (throat) can be extracted with higher precision. Therefore, the characteristic amount for use in the gradation conversion processing can be obtained more stably.

Moreover, in the constitution, since the characteristic amount extracting area is extracted using only the X coordinate x2 indicating the minimum value in which the projection f pro2 (x) is not "0" without using the secondary difference value f second (x), a high processing speed can be attained.

Furthermore, since the position where the value of the projection f pro2 (x) indicates the minimum value necessarily corresponds to a neck part (bone area of the throat), a more stable characteristic amount can be obtained.

Additionally, in the second embodiment, the projection f pro (x) of the first embodiment may be used to extract the characteristic amount extracting area. Conversely, in the first embodiment, the projection f pro2 (x) weighted with the pixel value may be used to extract the characteristic amount extracting area.

(Third Embodiment)

Figure 8:
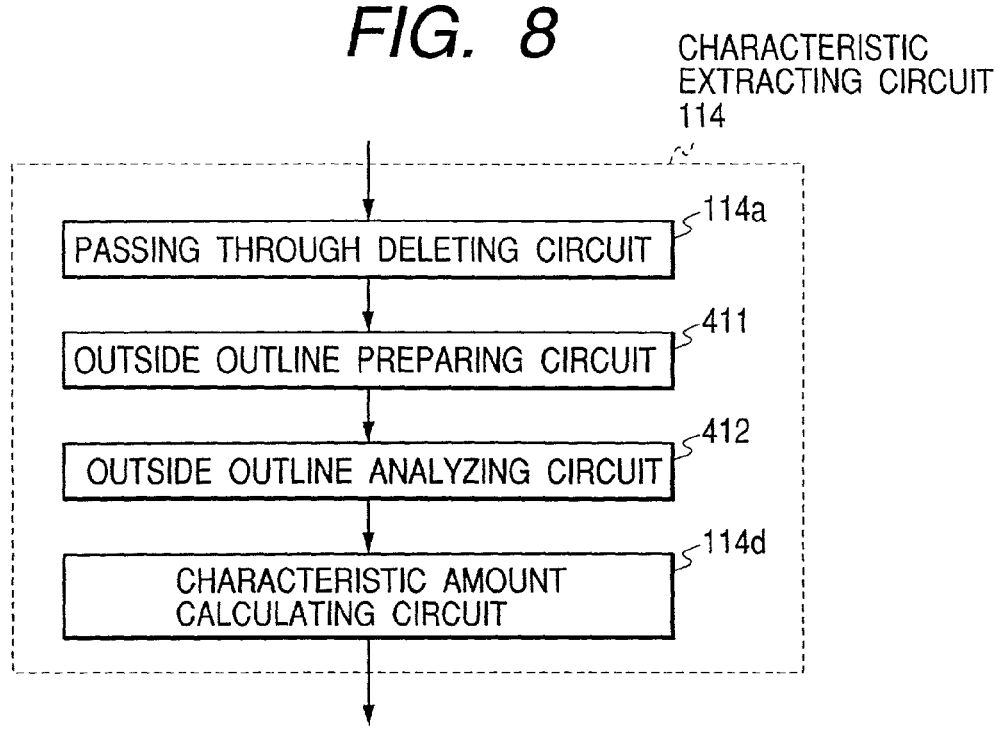
FIG. 8 is a block diagram showing the constitution of the characteristic amount extracting circuit in a third embodiment.

In a third embodiment, the inside of the characteristic amount extracting circuit 114 of FIG. 1 in the first embodiment is constituted, for example, as shown in FIG. 8.

Specifically, here in the characteristic amount extracting circuit 114, instead of the projection preparing circuit 114b and the projection analyzing circuit 114c shown in FIG. 1, there are provided an outside outline preparing circuit 411 for preparing the outside outline of the area which cannot be replaced with "0" in the projection preparing circuit 114b, and an outside outline analyzing circuit 412 for extracting the characteristic amount extracting area from the shape of the outside outline prepared in the outside outline preparing circuit 411.

Additionally, in the characteristic amount extracting circuit 114 of FIG. 8, the sections operating in the same manner as in the characteristic amount extracting circuit 114 of FIG. 1 are denoted with the same reference numerals, the detailed description thereof is omitted, and here only the constitution different from that of the first embodiment will be described in detail.

Figure 9:
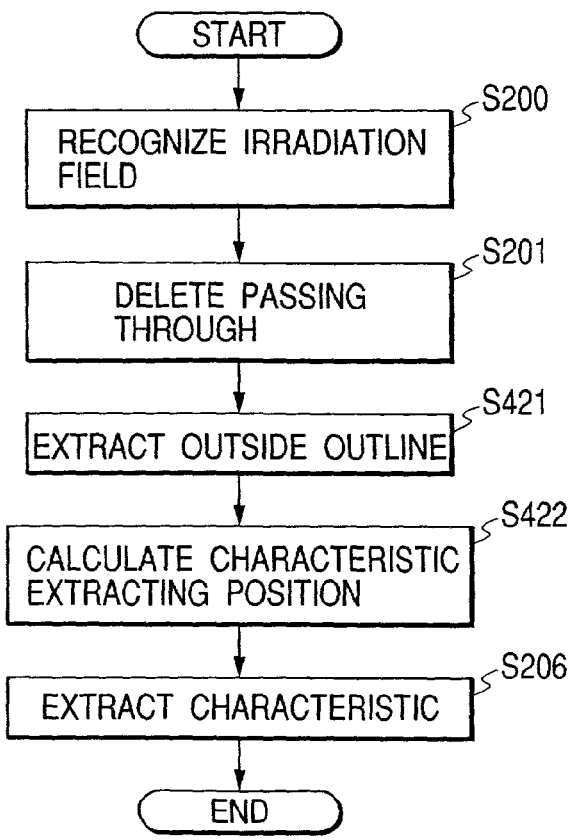
FIG. 9 is a flowchart showing the operation of the characteristic amount extracting circuit.

The characteristic amount extracting circuit 114 is operated, for example, as shown in the flowchart of FIG. 9.

Additionally, in the flowchart of FIG. 9, the steps executing processings in the same manner as in the flowchart of FIG. 2 are denoted with the same reference numerals, and the detailed description thereof is omitted.

First, as described above, the irradiation field recognizing circuit 113 extracts the irradiation field area from the input image data (step S200). Moreover, the passing through deleting circuit 114a deletes the area outside the irradiation field area, the passing through area in the irradiation area, and the field area contacting the passing through area with the constant width (step S201).

Figure 10B:
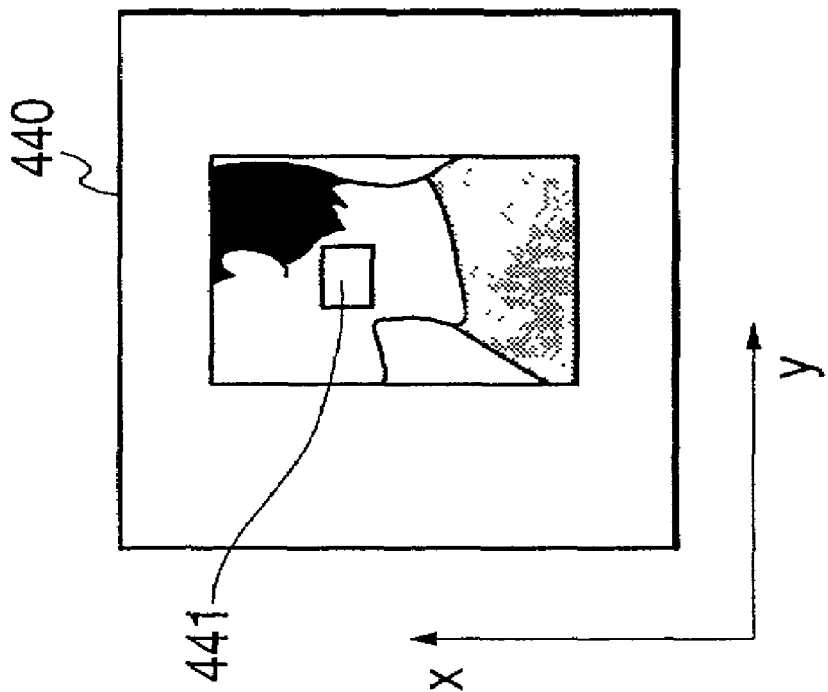
FIGS. 10A and 10B are explanatory views showing one example of the photographed image from which the characteristic amount is extracted in the characteristic amount extracting circuit.
Figure 10A:
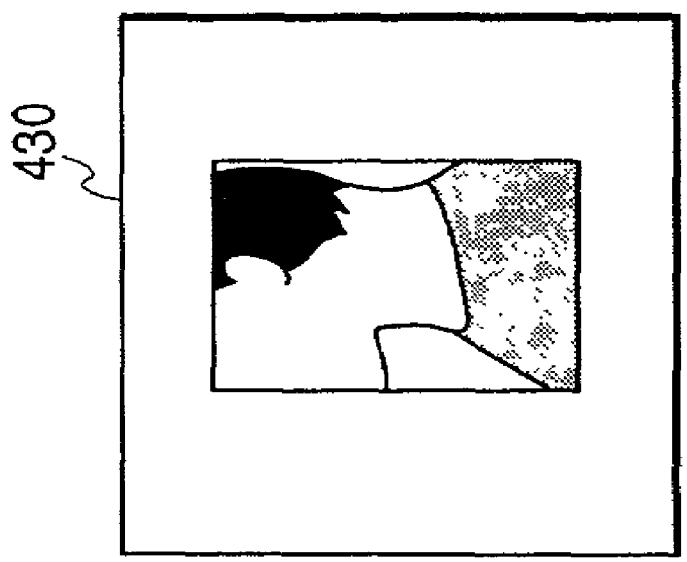

Here, for example, when the input image data comprises an image 430 of a cervical vertebra side part as shown in FIG. 10A, the image subjected to the passing through deletion processing in the passing through deleting circuit 114a turns to an image 440 of an outside outline as shown in FIG. 10B.

Additionally, an area 441 (white square portion in a central portion) shown in FIG. 10B indicates a characteristic amount extracting area described later. Moreover, when the area in which the pixel value is not "0" is searched in y coordinate direction, but is not found, for convenience, the outside outline is regarded as an image end portion ("0" or "dy").

Figure 11:
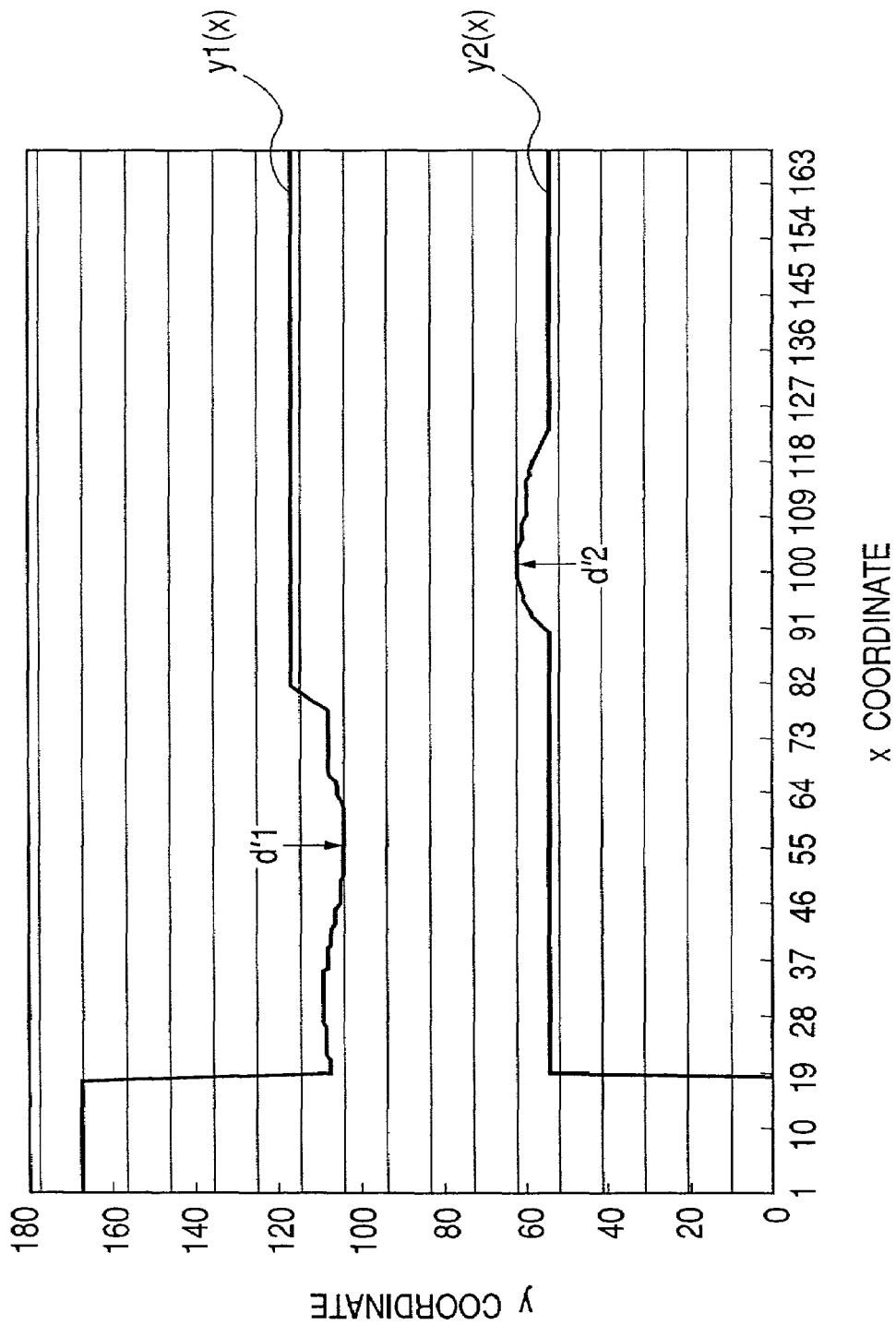
FIG. 11 is a graph showing the projection obtained in the characteristic amount extracting circuit.

Subsequently, the outside outline preparing circuit 411 extracts the outside outline as shown in FIG. 11 from the image data f2(x, y) obtained after binarizing the pixel value (pixel value in the image data f1 (x, y) after the passing through deletion processing) which cannot be replaced with "0" in the passing through deleting circuit 114a (step S421).

Here, the outside outline on the side of y=dy is set to y1(x), and the outside outline on the side of y=0 is set to y2(x). Here, the outside outline means the coordinate (hereinafter referred to as "the change coordinate") in which f2(x, y) changes to constant c from "0" in the predetermined x coordinate, the outside outline obtained by searching the change coordinate from the side of y=dy is y1(x), and the outside outline obtained by searching the change coordinate from the side of y=0 is y2(x). In this case, when no change coordinate is found, for convenience, the image end portion is regarded as the outside outline. Specifically, when scanning is performed from the side of y=dy, but no change coordinate is found, then y=dy is regarded as the outside outline. Similarly, when scanning from the side of y=0, y=0 is regarded as the outside outline.

Additionally, the outside outline analyzing circuit 412 calculates coordinate d'1 of the minimum value of the outside outline y1(x) obtained in the outside outline preparing circuit 411, and coordinate d'2 of the maximum value of the outside outline y2(x) by equations (16) and (17), and additionally calculates a starting point X coordinate x3 of the characteristic amount extracting area by equation (18) (step S422).

$$d'1 = \min\{y1(x) | 0 \leq x \leq dx\} \quad (16)$$

$$d'2 = \max\{y2(x) | 0 \leq x \leq dx\} \quad (17)$$

$$x3 = (d'1 + d'2)/2 \quad (18)$$

Additionally, the range of the coordinate x3 calculated by the above equation (18) is set so as to satisfy equation (19) or (20) with the coordinate x1 of the first embodiment and the coordinate x2 of the second embodiment. Moreover, instead of the above equation (18), equation (21) may be used.

$$x1 \leq x3 \leq (d'1 + d'2)/2 \quad (19)$$

$$x2 \leq x3 \leq (d'1 + d'2)/2 \quad (20)$$

$$x3 = x2/2 + (d'1 + d'2)/4 \quad (21)$$

Therefore, the coordinate x3 obtained in the outside outline analyzing circuit 412 is replaced with the coordinate x1 of the first embodiment, the coordinate (x1, xr, yu, yd) of the characteristic amount extracting area is calculated in the same manner as the first embodiment, the average value of pixel values in the coordinate is calculated as the density characteristic amount for use in the gradation conversion processing circuit 115, and the subsequent processing is advanced.

As described above, in the constitution of the embodiment, the characteristic amount extracting area is extracted from the depression point of the outside outline. Even when the depression positions of both end portions of the characteristic amount extracting area (noted area) deviate (e.g., like in the photographing of cervical vertebra side part, the depressions of the neck deviate in opposite neck end portions), the characteristic amount extracting area can stably be extracted. Therefore, the characteristic amount for use in the gradation conversion processing can be obtained more stably.

Moreover, when the X coordinate x3 as the coordinate information of the characteristic amount extracting area is obtained in consideration of the X coordinate x1 of the first embodiment and the X coordinate x2 of the second embodiment, for example, an effect that the characteristic amount extracting area fails to overlap the shoulder or the head can be obtained.

(Fourth Embodiment)

Figure 12A:
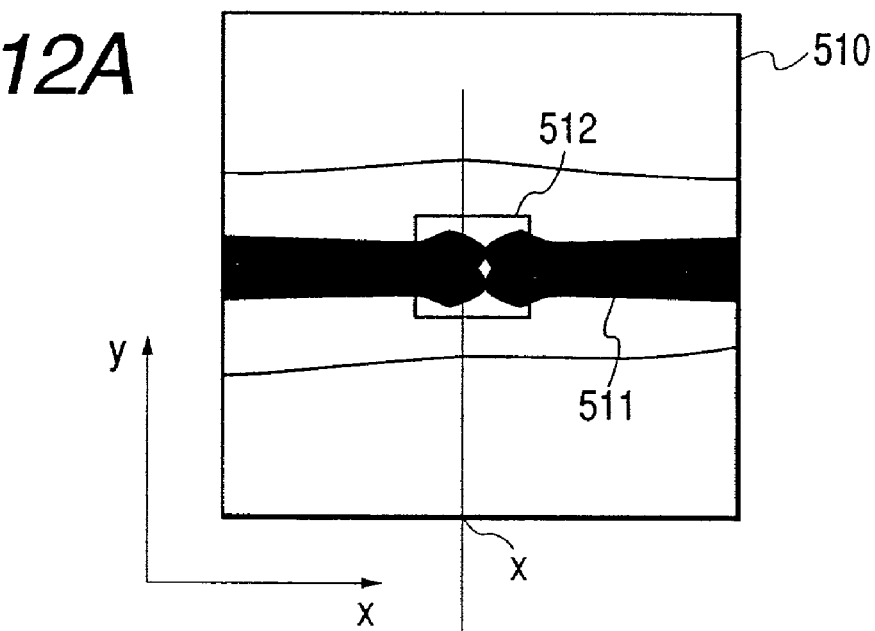
FIGS. 12A and 12B are explanatory views of the projection obtained in the characteristic amount extracting circuit in a fourth embodiment.

In a fourth embodiment, in the characteristic amount extracting circuit 114 of FIG. 1, the projection preparing circuit 114b and the projection analyzing circuit 114c are operated as follows:

First, for example, the input image data comprises an image 510 of an elbow joint part as shown in FIG. 12A. In FIG. 12A, an area 511 (dense portion) shows a bone area. In the photographing of the joint part of the elbow, a knee, and the like, there is a tendency to place a joint part in the center of the photographing area. Additionally, it is known that when the gradation conversion processing is performed so that the density value of the bone area of the joint part is set, for example, to about 1.0 on the film, the film with the gradation preferable for diagnosis can be obtained. In the drawing, an area 512 shows the characteristic amount extracting area.

Here, the projection preparing circuit 114b has a function of using the binarized image data f2(x, y) obtained by the equation (4) to prepare the projection, and additionally has a function of using the image data f2(x, y) to prepare projection f pro3 (x, y) by equation (22).

$$f\_pro3(x) = \int_0^{dy} f2(x, y) \times f4(x) \, dy \qquad (22)$$

In the equation (22), "f4(x, y)" indicates a function dependent on the value of horizontal axis X. Examples of the function include a function represented by equation (23) with a coordinate center Xmid on X-axis.

$$f4(x) = Xmid - X \qquad (23)$$

Additionally, the function f4(x, y) is not limited to the form of the above equation (23). Moreover, the coordinate center Xmid may be, for example, a center of gravity represented by equation (24).

$$Xmid = \frac{\int_0^{dx} \int_0^{dy} x \times f2(x, y) \, dy \, dx}{\int_0^{dx} \int_0^{dy} f2(x, y) \, dy \, dx} \qquad (24)$$

Furthermore, instead of the above equation (22), equations (25) and (26) may be used to prepare the projection f pro3 (x, y).

$$f\_pro3(x) = \int_0^{dy} f2(x, y) \times f3(x, y) \times f4(x) \, dy \qquad (25)$$

$$f\_pro3(x) = \int_0^{dy} f2(x, y) \, dy \qquad (26)$$

Figure 12B:
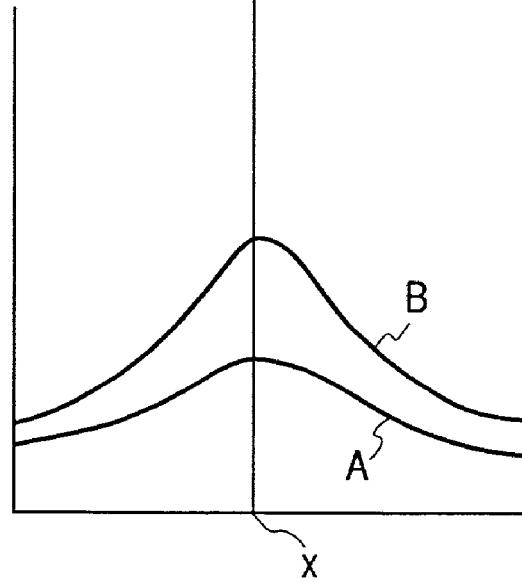

Therefore, in the projection preparing circuit 114b, the projection f pro3 (x, y) is prepared as shown in FIG. 12B. In FIG. 12B, the projection f pro3 (x, y) shown by "A" indicates a general projection, and the projection f pro3 (x, y) shown by "B" indicates a projection weighted with a distance.

Subsequently, the projection analyzing circuit 114c obtains X coordinate x4 indicating the maximum value of the projection f pro3 (x, y) prepared by the projection preparing circuit 114b by equation (27).

$$x4 = \max\{fpro3(x) | 0 \leq x \leq D\} \qquad (27)$$

Therefore, the coordinate x4 obtained in the projection analyzing circuit 114c is replaced with the X coordinate x1 of the first embodiment, the coordinate (x1, xr, yu, yd) of the characteristic amount extracting area is calculated in the same manner as the first embodiment, the average value of pixel values in the coordinate is calculated as the density characteristic amount for use in the gradation conversion processing circuit 115, and the subsequent processing is advanced.

As described above, in the constitution of the embodiment, the projection f pro3 (x, y) is prepared in consideration of the tendency to place the characteristic amount extracting area (joint part) in the central portion of the coordinate. Therefore, the rising of the projection in the image central portion can further be emphasized, and the coordinate of the characteristic amount extracting area can be extracted more stably. The characteristic amount for use in the gradation conversion processing can thus be obtained more stably.

(Fifth Embodiment)

The present inventors have experimentally found that to display photographed data of cervical vertebra on an X-ray diagnosis film, when the pixel value of the vicinity of the bone area of throat is used as density characteristic amount to perform gradation conversion, a stable gradation characteristic can be obtained. A fifth embodiment has been developed based on the finding.

Figure 13:
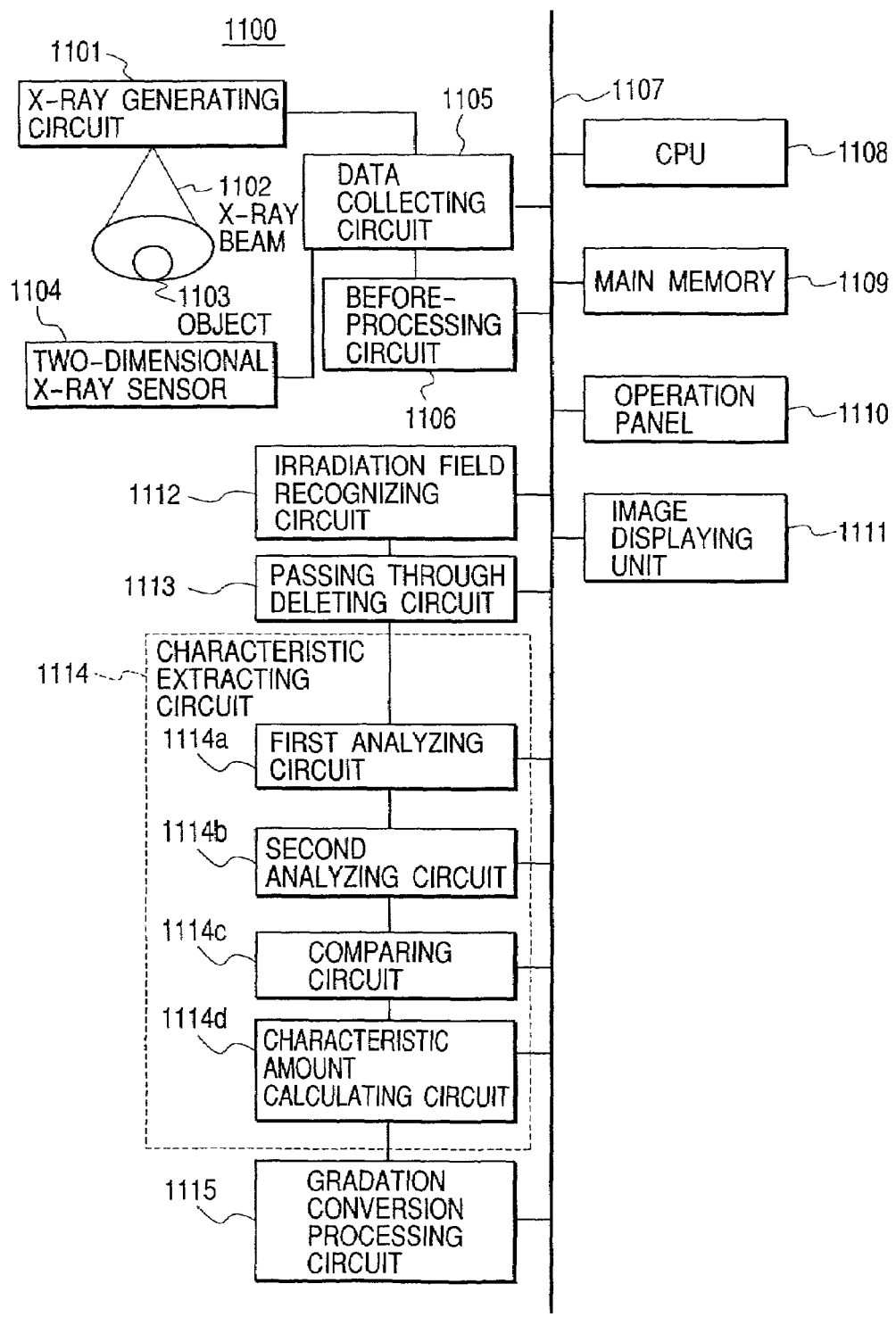
FIG. 13 is a block diagram showing the constitution of a digital X-ray photographing device according to a fifth embodiment.

FIG. 13 shows the constitution of a digital X-ray photographing device 1100 according to the embodiment.

The digital X-ray photographing device 1100 has an X-ray image processing function including a density value converting function, and is provided with a before-processing circuit 1106, an irradiation field extracting circuit 1112, a passing through deleting circuit 1113, a characteristic amount extracting circuit 1114, a density value converting circuit 1115, a CPU 1108, a main memory 1109, an operation panel 1110, and an image displaying unit 1111. These components exchange data via a CPU bus 1107.

Moreover, the device is provided with a data collecting circuit 1105 connected to the before-processing circuit 1106, a two-dimensional X-ray sensor 1104 connected to the data collecting circuit 1105, and an X-ray generating circuit 1101. These circuits are also connected to the CPU bus 1107.

Figure 14:
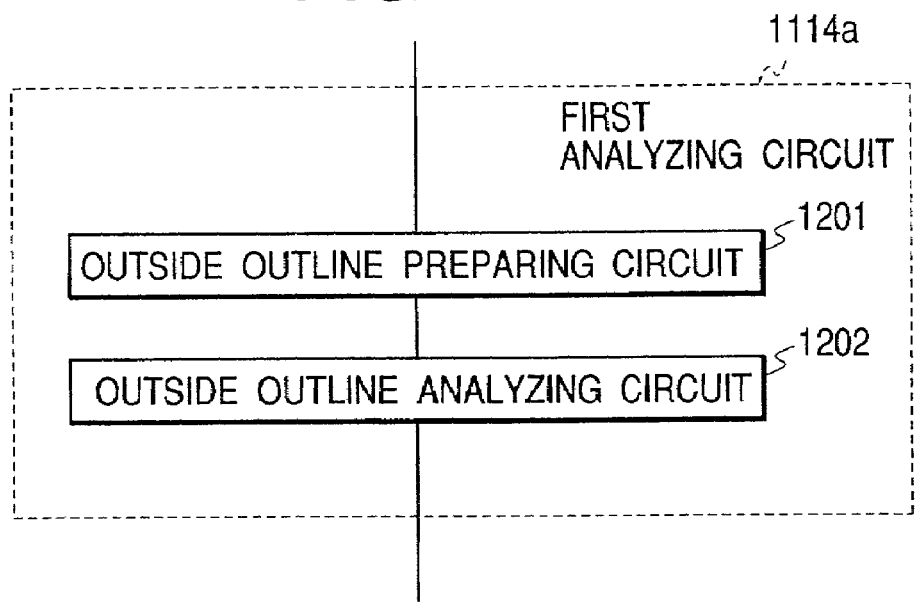
FIG. 14 is a block diagram showing the constitution of a first analyzing circuit.
Figure 15:
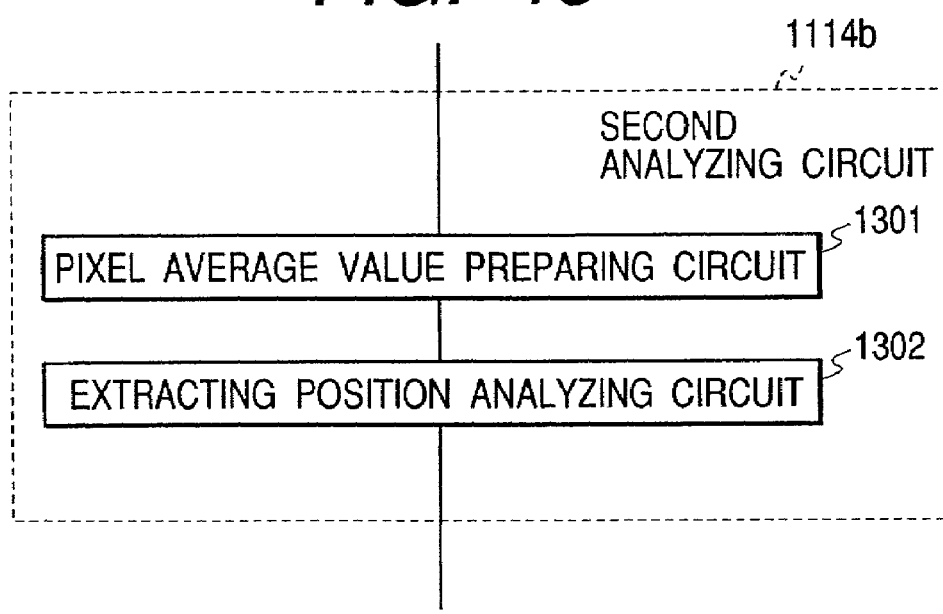
FIG. 15 is a block diagram showing the constitution of a second analyzing circuit.

FIG. 14 is a block diagram showing the inside constitution of a first analyzing circuit 1114a in the characteristic amount extracting circuit 1114, and FIG. 15 is a block diagram showing the inside constitution of a second analyzing circuit 1114b in the characteristic amount extracting circuit 1114.

Figure 16:
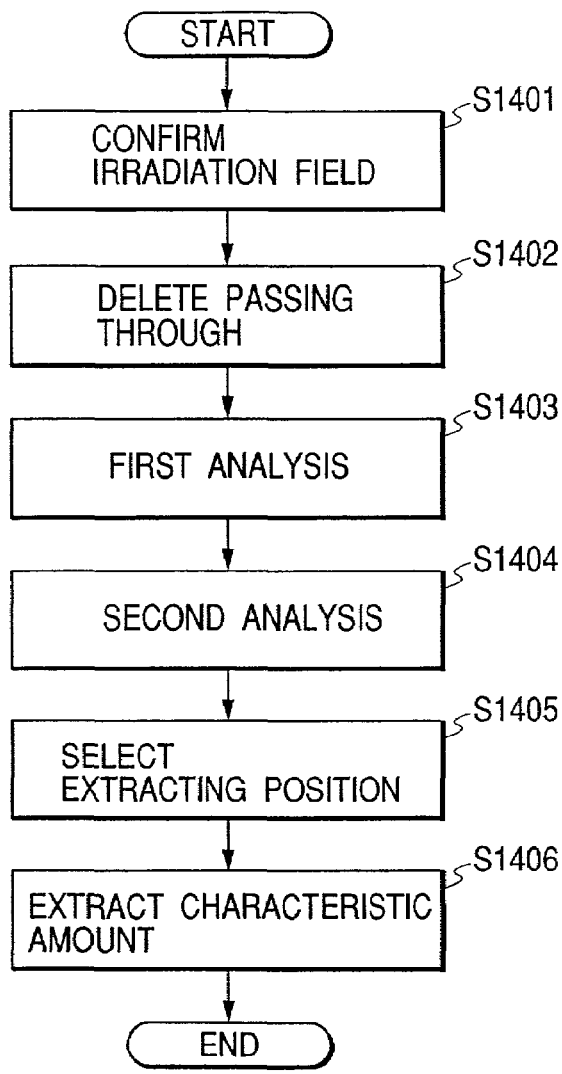
FIG. 16 is a flowchart showing the flow of an image judgment processing.
Figure 17:
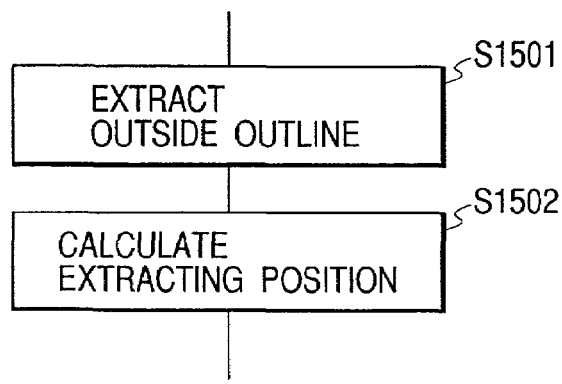
FIG. 17 is a flowchart showing the flow of a first analysis processing.

FIG. 16 is a flowchart showing the flow of an image judgment processing in the embodiment, FIG. 17 is a flowchart showing a detailed processing flow of first analysis processing S1403 of FIG. 16, and FIG. 18 is a flowchart showing a detailed processing flow of second analysis processing S1404 of FIG. 16.

FIGS. 19A and 20A show cervical vertebra data obtained by the digital X-ray photographing device. Since head and shoulder are poor in X-ray transmittance, obtained data has a lower pixel value as compared with throat or X-ray passing through portion (in this case, a portion having a low X-ray transmittance is regarded as a low pixel value, and a portion having a high X-ray transmittance is regarded as a high pixel value. In a converse case, it is easy for a person skilled in the art to change formula).

FIG. 19B or 20B is obtained by deleting the passing through portion from FIG. 19A or 20A, and shows the area from which the characteristic amount extracted by the first analyzing circuit 1114a is extracted with a white square. FIG. 19C or 20C shows the area from which the characteristic amount extracted by the second analyzing circuit 1114b is extracted with a white square.

Figure 21:
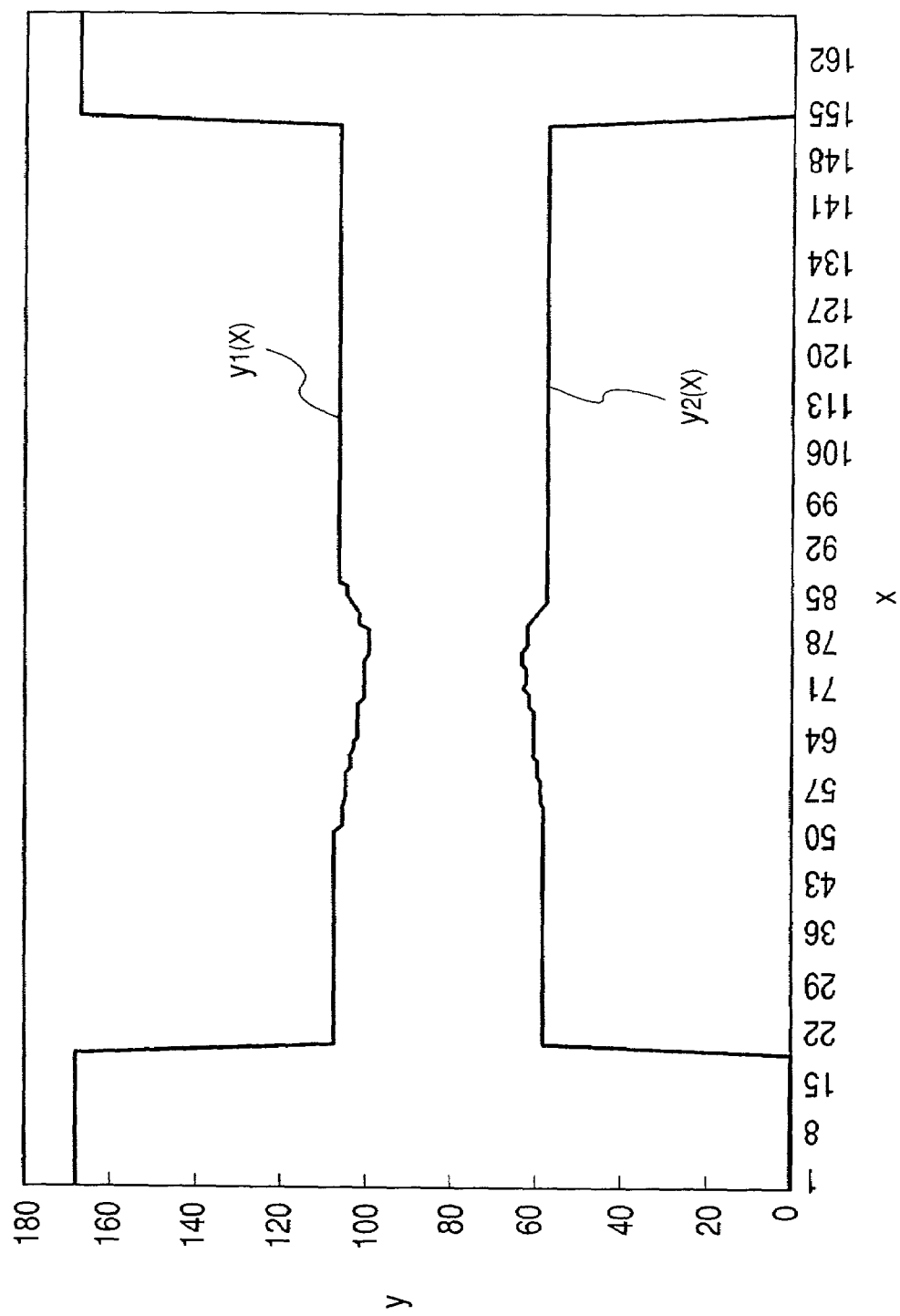
FIG. 21 is a characteristic diagram showing an outside outline.

FIG. 21 is a graph showing the outside outline of FIG. 19B prepared in the outside outline preparing circuit 1201, in which abscissa shows y coordinate, and ordinate shows x coordinate.

Figure 22:
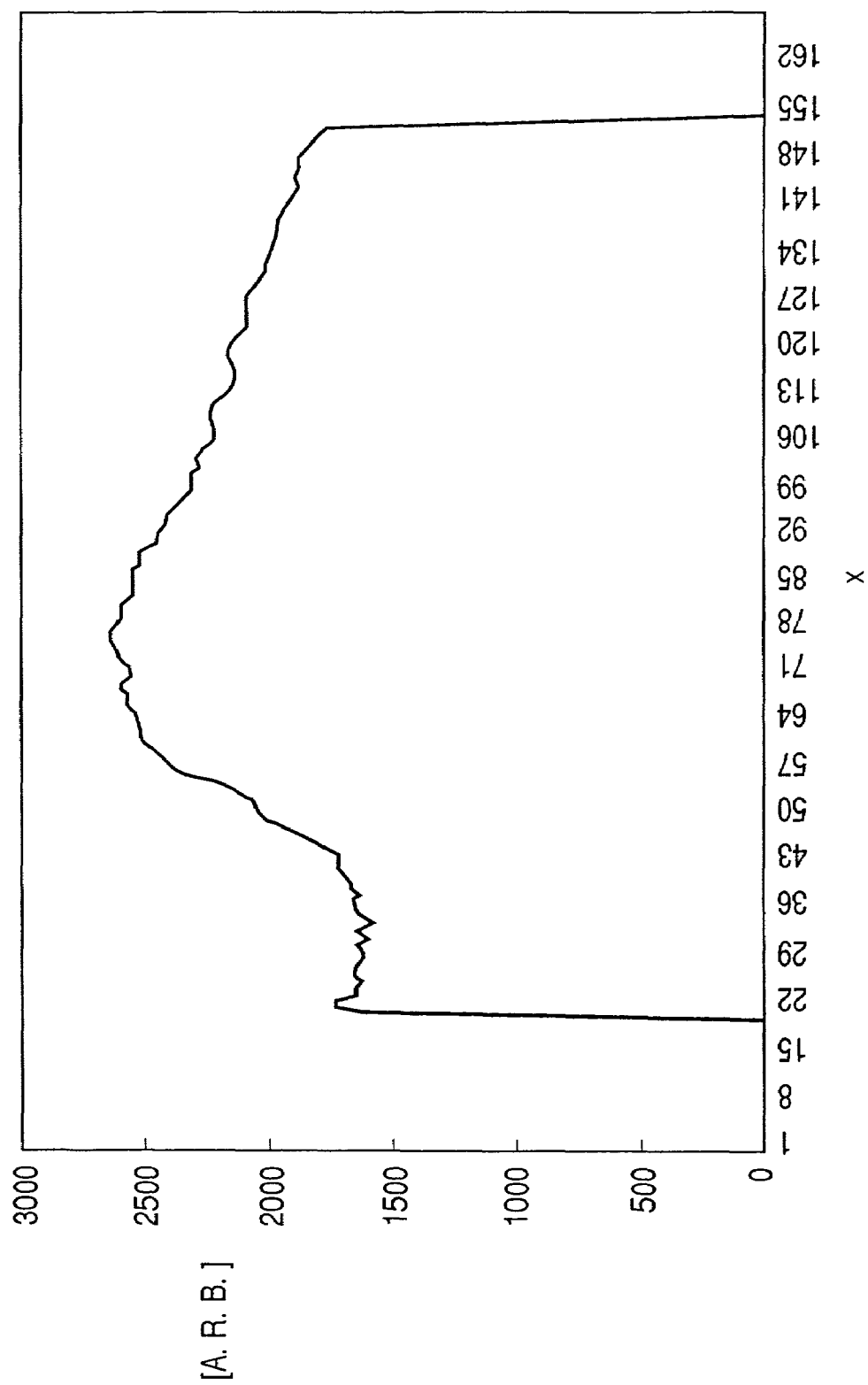
FIG. 22 is a characteristic diagram showing an average pixel value.

FIG. 22 is a graph of a pixel average value prepared by the pixel average value preparing circuit.

In FIG. 13, the main memory 1109 is used as a memory which stores various data necessary for the processing in the CPU 1108, and is additionally used as a work memory for the operation of the CPU 1108. The CPU 1108 uses the main memory 1109 to perform the operation control of the entire device or the like according to the operation from the operation panel 1110. Thereby, the device 1100 operates as follows:

First, the X-ray generating circuit 1101 radiates an X-ray beam 1102 to an object 1103. The radiated X-ray beam 1102 is attenuated and transmitted through the object 1103 to reach the two-dimensional X-ray sensor 1104, and outputted as an X-ray image by the two-dimensional X-ray sensor 1104. The X-ray image outputted from the two-dimensional X-ray sensor 1104 is, for example, a cervical vertebra image.

The data collecting circuit 1105 converts the X-ray image outputted from the two-dimensional X-ray sensor 1104 into an electric signal and transmits the signal to the before-processing circuit 1106. The before-processing circuit 1106 performs pre-processings such as an offset correction processing and a gain correction processing on the signal (X-ray image signal) from the data collecting circuit 1105. The X-ray image signal subjected to the pre-processing in the before-processing circuit 1106 is transferred as an input image to the main memory 1109 and the irradiation area extracting circuit 1112 via the CPU bus 1107. The irradiation area extracting circuit 1112 extracts the area in which X rays are directly radiated to the two-dimensional X-ray sensor 1104. The passing through deleting circuit 1113 deletes the passing through area in the irradiation area extracted by the irradiation area extracting circuit 1112, and the field area contacting the passing through area with the constant width.

In the characteristic amount extracting circuit 1114, the first analyzing circuit 1114a analyzes the area in which the characteristic amount is extracted from the outside outline of the area from which the passing through area is deleted by the passing through deleting circuit 1113, and is, as shown in FIG. 14, provided with an outside outline preparing circuit 1201 for preparing the outside outline and an outside outline analyzing circuit 1202 for analyzing the area from which the characteristic amount is extracted from the outside outline prepared by the outside outline preparing circuit 1201.

The second analyzing circuit 1114b analyzes the area in which the characteristic amount is extracted from the pixel average value of the area from which the passing through area is deleted by the passing through deleting circuit 1113, and is, as shown in FIG. 15, provided with a pixel average value preparing circuit 1301 for preparing the pixel average value, and an extracting position analyzing circuit 1302 for analyzing the area in which the characteristic amount is extracted from the pixel average value prepared by the pixel average value preparing circuit 1301.

Numeral 1114c denotes a comparing circuit for analyzing the area from which the characteristic amount is finally extracted from the coordinate of the area extracted by the first and second analyzing circuits 1114a, 1114b, and 1114d denotes a characteristic amount calculating circuit for calculating the characteristic amount from the area, extracted by the comparing circuit 1114c, from which the characteristic amount is finally extracted.

The gradation converting circuit 1115 performs gradation conversion based on the density characteristic amount calculated by the characteristic amount calculating circuit 1114d.

The operation of the characteristic amount extracting circuit 1114 will next be described with reference to FIGS. 14 to 18.

The irradiation area extracting circuit 1112 extracts the irradiation area from the input image processed by the before-processing circuit 1106. As the extracting method, the system proposed before by the present inventor, and the like can be used (step S1401).

On the other hand, the passing through deleting circuit 1113 having simultaneously received the input image replaces the passing through area outside and inside the irradiation area extracted by the irradiation area extracting circuit 1112 and the field area contacting the passing through area within a predetermined interval, for example, with "0" pixel (step S1402). Specifically, the following image conversion is performed.

$$f1(x,y) = f(x,y) \times \prod_{x1=-d1}^{x1=d1} \prod_{y1=-d2}^{y1=d2} sgn(x+x1, y+y1) \qquad (28)$$

Here, f(x, y) indicates image data, f1(x, y) indicates the image from which the passing through area and the field area contacting the passing through area within the constant interval are deleted, and sgn(x, y) is represented as follows. A constant Th1 is determined by experiment, for example, as a value of 90% of the maximum pixel value of the entire image, and d1, d2 are constants for determining the width to delete the field area.

sgn($x,y$)=0 when $f(x,y) \geq Th1$ sgn($x,y$)=1 others  (29)

Subsequently, the first analyzing circuit 1114a is used to analyze the input image from which the passing through area is deleted (S1403). The outside outline of pixel value f1(x, y) which cannot be replaced with 0 in the passing through deleting circuit 1113 is extracted (FIG. 21). Here, the outside outline on the side of y=dy is set to y1(x), the outside outline on the side of y=0 is set to y2(x), and dx or dy shows an x or y axis length of the image, for example, 168. Here, the outside outline means the coordinate (hereinafter referred to as the change coordinate) in which f1(x, y) changes from 0 to the value other than 0 in the predetermined x coordinate. The outline obtained by scanning the change coordinate from the side of y=dy is y1(x), and the change coordinate scanned from the side of y=0 is y2(x).

Here, when no change coordinate is found, for convenience the image end portion is regarded as the outside outline. Specifically, when no change coordinate is found by scanning from the side of y=dy, y=dy is regarded as the outside outline. Similarly, when scanning from the side of y=0, y=0 is regarded as the outside outline (step S1501).

The outside outline analyzing circuit 1202 calculates coordinate d1 of the minimum value of y1(x) and coordinate d2 of the maximum value of y2(x) by equations (30), (31), and calculates starting point coordinate x1 of the area to be extracted by equation (32).

$d1 = \min\{y1(x)|0 \leq x \leq dx\}$  (30)

$d2 = \max\{y2(x)|0 \leq x \leq dx\}$  (31)

$x1 = (d1+d2)/2$  (32)

Then, coordinates xl1, xr1 on x-axis of the characteristic extracting portion to be obtained are as follows:

$xr1 = x1-d3$  (33)

$xl1 = x1+d4$  (34)

Here, d3 to d6 are constants, and each thereof is, for example, 20.

Subsequently, when the change coordinates in x=x1 are yel1, yer1, as shown in equations (35) to (37), the coordinates on y-axis of the characteristic extracting portion to be obtained are yl1, yr1 (step S1502).

White passing through results of the coordinate (xl1, xr1, yl1, yr1) are shown, for example, in FIGS. 19B, 20B.

$$y1(yel1+yer1)/2 \tag{35}$$

$$yl1=y1-d5 \tag{36}$$

$$yr1=y1+d6 \tag{37}$$

In the area (xl1, xr1, yl1, yr1) extracted by the first analyzing circuit 1114a, for the image in which depressions are generated in both neck area ends, the neck bone area can be extracted with good precision. However, as shown in FIG. 20B, when no depression is found in one end of the neck, the extraction of the desired area is unsuccessful in some cases.

Subsequently, the second analyzing circuit 1114b is used to analyze the input image from which the passing through area is deleted (S1404).

In the pixel average value preparing circuit 1301, the pixel is scanned in y-axis direction to calculate average pixel value f(x) according to equations (38), (39) (step S1602).

$$f(x) = \frac{\int_0^{dy} f1(x, y) \times \text{sign}(f1(x, y)) \, dy}{\int_0^{dy} \text{sign}(f1(x, y)) \, dy} \tag{38}$$

if $x=0$ sign$(x)=0$ else sign$(x)=1$ \hfill (39)

Here, dy denotes y-axis length of the image.

Subsequently, the extracting position analyzing circuit 1302 calculates coordinate x2 of the maximum value of f(x) according to equation (40).

$$x2=\max(f(x)) \tag{40}$$

Then, coordinates xl2, xr2 on x-axis of the characteristic extracting portion to be obtained are as follows:

$$xr2=x2-d7 \tag{41}$$

$$xl2=x2+d8 \tag{42}$$

Here, d7 to d10 are constants, and each thereof is, for example, 20.

Subsequently, when the change coordinates in x=x2 are yel2, yer2, as shown in equations (43) to (45), the coordinates on y-axis of the characteristic extracting portion to be obtained are yl2, yr2 (step S1602).

White passing through results of coordinate (xl2, xr2, yl2, yr2) are shown, for example, in FIGS. 19C, 20C.

$$y2=(yel2+yer2)/2 \tag{43}$$

$$yl2=y2-d9 \tag{44}$$

$$yr2=y2+d10 \tag{45}$$

In the area extracted by the second extracting position analyzing circuit 1302, even if there is no depression in both neck ends, the neck bone area can be extracted with good precision, and there is no failure in the area extraction.

Subsequently, the comparing circuit 1114c compares coordinate distances of x1, x2 following equation (46), and employs the analysis result of the first analyzing circuit 1114a or the second analyzing circuit 1114b (step S1405).

$$\begin{aligned} &\text{if}(|x1-x2|)<D \quad x3=x1 \\ &\text{else} \quad\quad\quad\quad\quad\; x3=x2 \end{aligned} \tag{46}$$

Here, when there is depression information in the neck both ends, the result of the first analyzing circuit 1114a is employed. If there is no depression, the result of the second analyzing circuit 1114b is employed. When there are depression information on both neck ends, the first analyzing circuit 1114a is not different from the second analyzing circuit 1114b in extracting coordinate. When there is no depression information, a difference is made in the extracting coordinate, which is an experiment fact as a basis.

When there is depression information, the result of the first analyzing circuit 1114a with better precision is employed. When there is no depression information, the result of the second analyzing circuit 1114b with no failure of area extraction is employed.

Coordinates xl3, xr3 on x-axis of the characteristic extracting portion to be obtained are as follows:

$$xr3=x3-dl1 \tag{47}$$

$$xl3=x3+dl2 \tag{48}$$

Here, dl1 to dl4 are constants, and each of them is, for example, 20.

Subsequently, when the change coordinates in x=x3 are yel3, yer3, as shown in equations (49) to (51), the coordinates on y-axis of the characteristic extracting portion to be obtained are yl3, yr3.

$$y3=(yel3+yer3)/2 \tag{49}$$

$$yl3=y3-dl3 \tag{50}$$

$$yr3=y3+dl4 \tag{51}$$

The area (xl3, xr3, yl3, yr3) is a final characteristic amount extracting area.

Here, as shown in equation (52) the value of x3 may be the average value of x1, x2.

$$X3=(x1+x2)/2 \tag{52}$$

For the average value, when there is depression information, higher precision is provided. Even when there is no depression information, no failure is made in area extraction.

Moreover, a value between x1 and x2 may be used. Even in this case, the extracting area corresponds to the neck bone area.

Subsequently, the characteristic amount calculating circuit 1114d calculates the average value of pixel values in area (xl3, xr3, yl3, yr3), and uses the value as the density characteristic amount for gradation conversion (step S1406). Here, the intermediate value in the area, and the like may be used. Then, the gradation conversion is performed so that the characteristic amount extracted in the gradation converting circuit 1115 reaches, for example, a density value of 1.4.

According to the embodiment, the throat area is extracted from the coordinate determined by the pixel average value. Even when there is no depression information in the neck, the throat area can effectively be extracted with good precision. Moreover, when there is neck depression information, or when there is no information, the coordinate to be selected is changed. Therefore, when there is depression information, the neck area can effectively be extracted with good precision. Even when there is no information, the area can effectively be extracted without failure. Therefore, the density characteristic amount for more stable gradation conversion can effectively be obtained.

(Sixth Embodiment)

Figure 23:
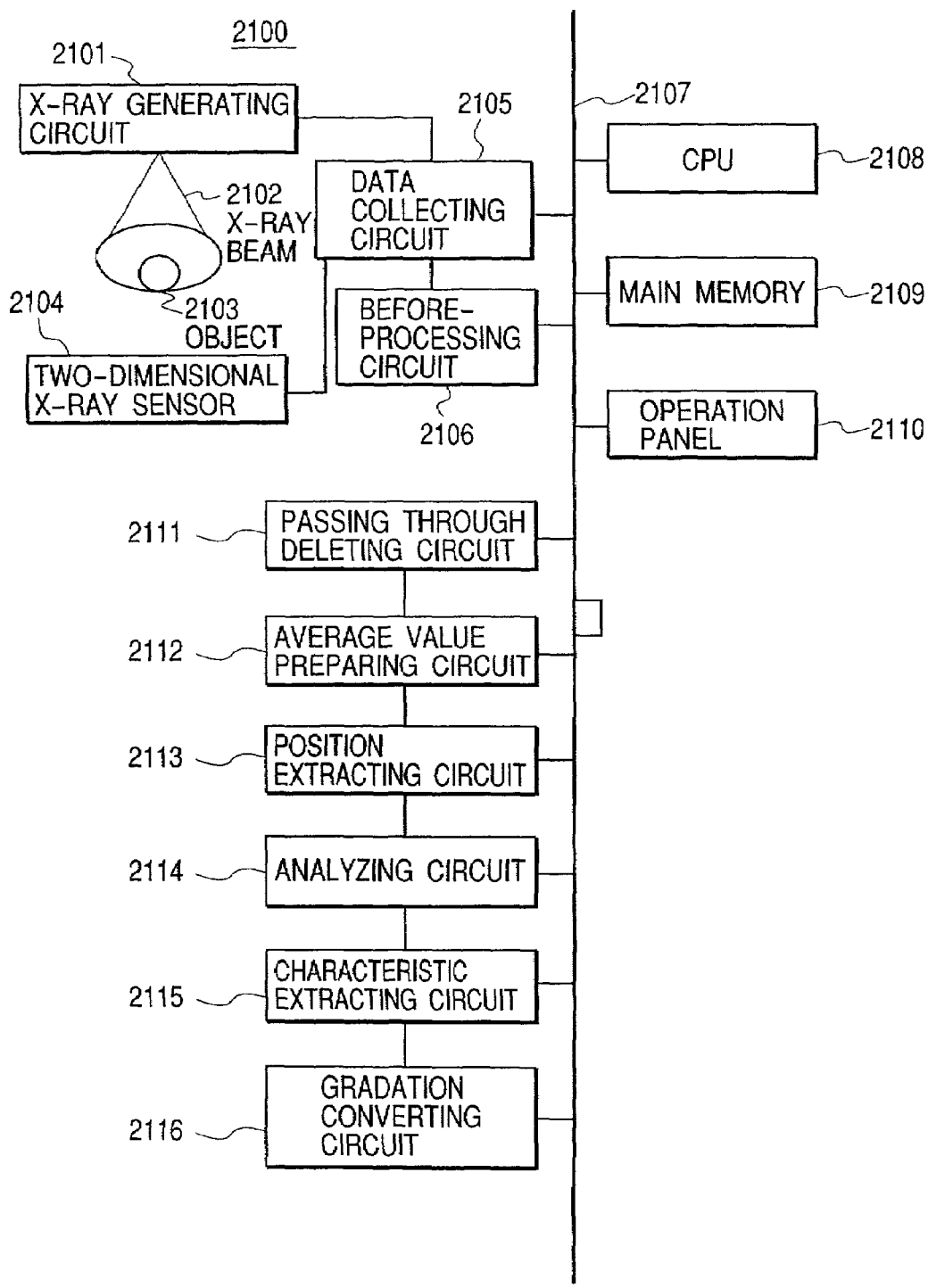
FIG. 23 is a block diagram showing the constitution of a sixth embodiment.

FIG. 23 shows the constitution of an X-ray photographing device 2100 according to a sixth embodiment. Specifically, the X-ray photographing device 2100 is an X-ray image processing device having an image processing function, and is provided with a before-processing circuit 2106, a density value converting circuit 2115, a CPU 2108, a main memory 2109, and an operation panel 2110. These components exchange data via a CPU bus 2107.

Moreover, the X-ray photographing device 2100 is provided with a data collecting circuit 2105 connected to the before-processing circuit 2106, a two-dimensional X-ray sensor 2104 connected to the data collecting circuit 2105, and an X-ray generating circuit 2101. These circuits are also connected to the CPU bus 2107.

The main memory 2109 stores various data necessary for the processing in the CPU 2108, and includes a work memory for the operation of the CPU 2108. The CPU 2108 uses the main memory 2109 to perform operation control of the entire device according to the operation from the operation panel 2110.

Numeral 2111 denotes a passing through extracting circuit for extracting the field area (hereinafter referred to as the passing through area) which contacts the passing through area in the constant width; 2112 denotes an average value preparing circuit for calculating an average pixel value of image of the object area excluding the passing through area extracted by the passing through extracting circuit 2111; 2113 denotes a position extracting circuit for detecting a predetermined value (e.g., a maximum value, a minimum value, and the like) of the average pixel value calculated in the average value preparing circuit 2112 to extract a predetermined coordinate; 2114 denotes an analyzing circuit for performing analysis of a range in which characteristic amount is calculated based on the coordinate extracted by the position extracting circuit 2113; 2115 denotes a characteristic extracting circuit for calculating the characteristic amount from the range obtained in the analyzing circuit 2114; and 2116 denotes a gradation converting circuit for performing gradation conversion of original image based on the average pixel value extracted by the position extracting circuit 2113 and the characteristic amount calculated by the characteristic extracting circuit 2115.

The image processing device 2100 operates as follows:

First, the X-ray generating circuit 2101 radiates an X-ray beam 2102 to an object 2103. The X-ray beam 2102 radiated from the X-ray generating circuit 2101 is attenuated and transmitted through the object 2103 to reach the two-dimensional X-ray sensor 2104, and outputted as an X-ray image by the two-dimensional X-ray sensor 2104. The X-ray image outputted from the two-dimensional X-ray sensor 2104 is, for example, an image for medical purposes such as a cervical vertebra image.

The data collecting circuit 2105 converts the X-ray image outputted from the two-dimensional X-ray sensor 2104 into an electric signal and transmits the signal to the before-processing circuit 2106. The before-processing circuit 1106 performs pre-processings such as an offset correction processing and a gain correction processing on the signal (X-ray image signal) from the data collecting circuit 2105. The X-ray image signal subjected to the pre-processing in the before-processing circuit 2106 is transferred as the original image to the main memory 2109 via the CPU bus 2107 by control of CPU 2108.

The flow of an image processing performed in the image processing device will next be described with reference to the drawings.

Figure 24:
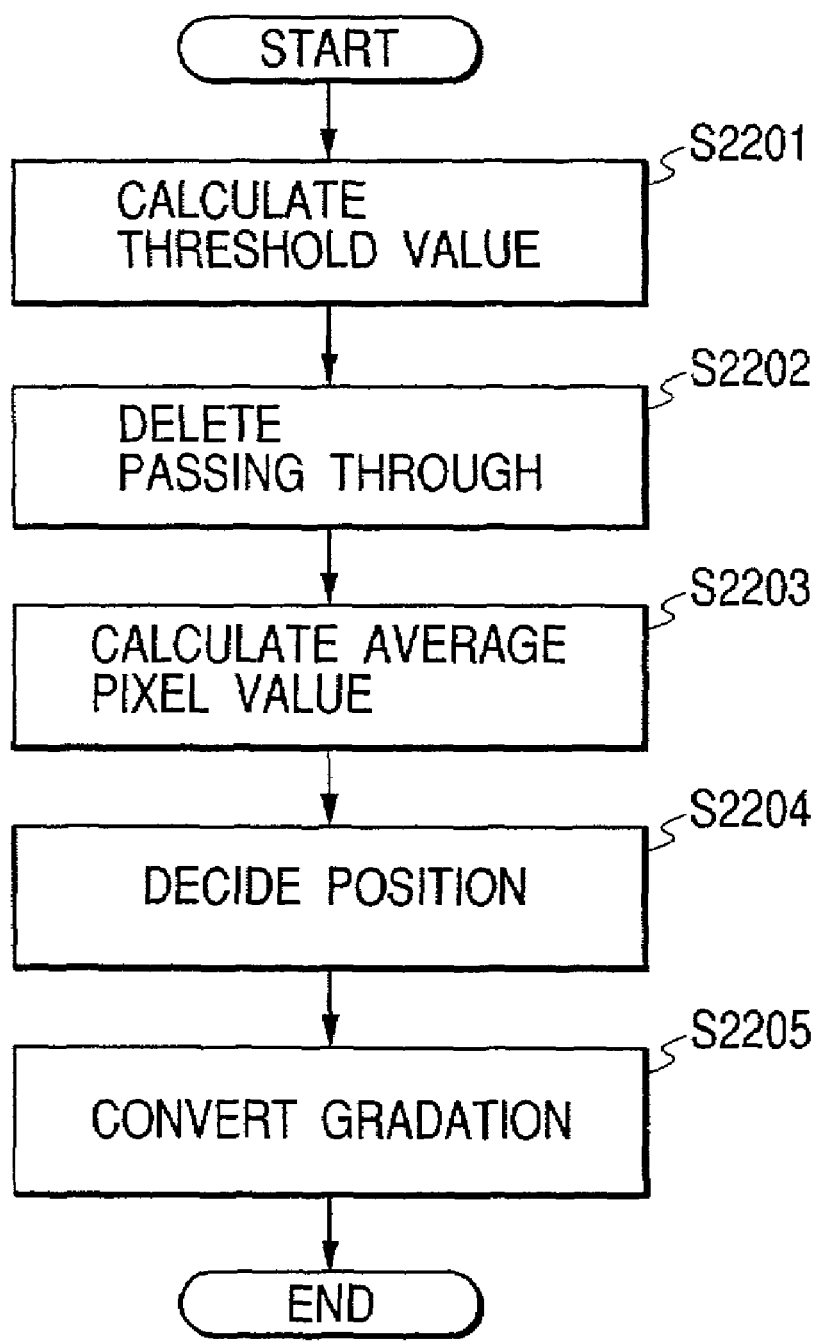
FIG. 24 is a flowchart showing a processing flow according to the sixth embodiment.
Figure 25A:
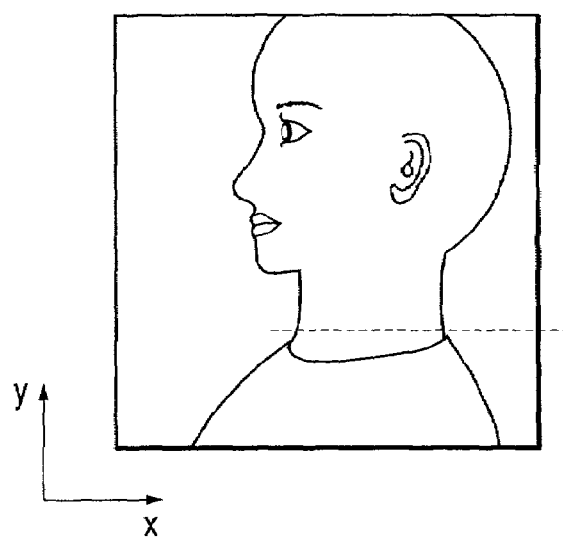
FIGS. 25A and 25B are diagrams showing a relation between a cervical vertebra image and an average pixel value.
Figure 25B:
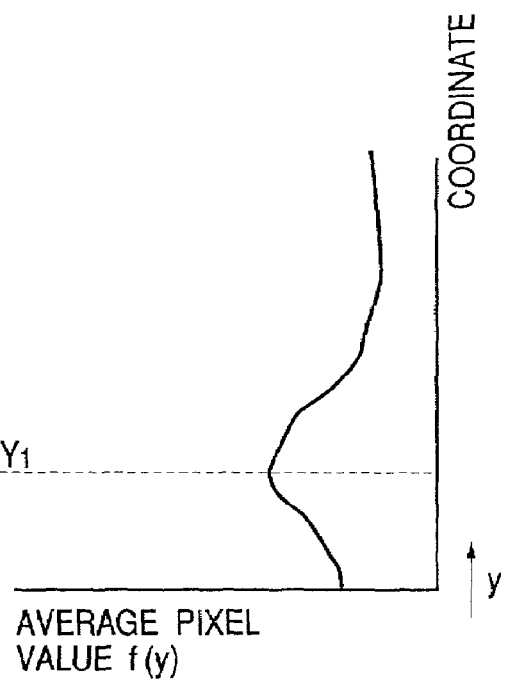
Figure 26:
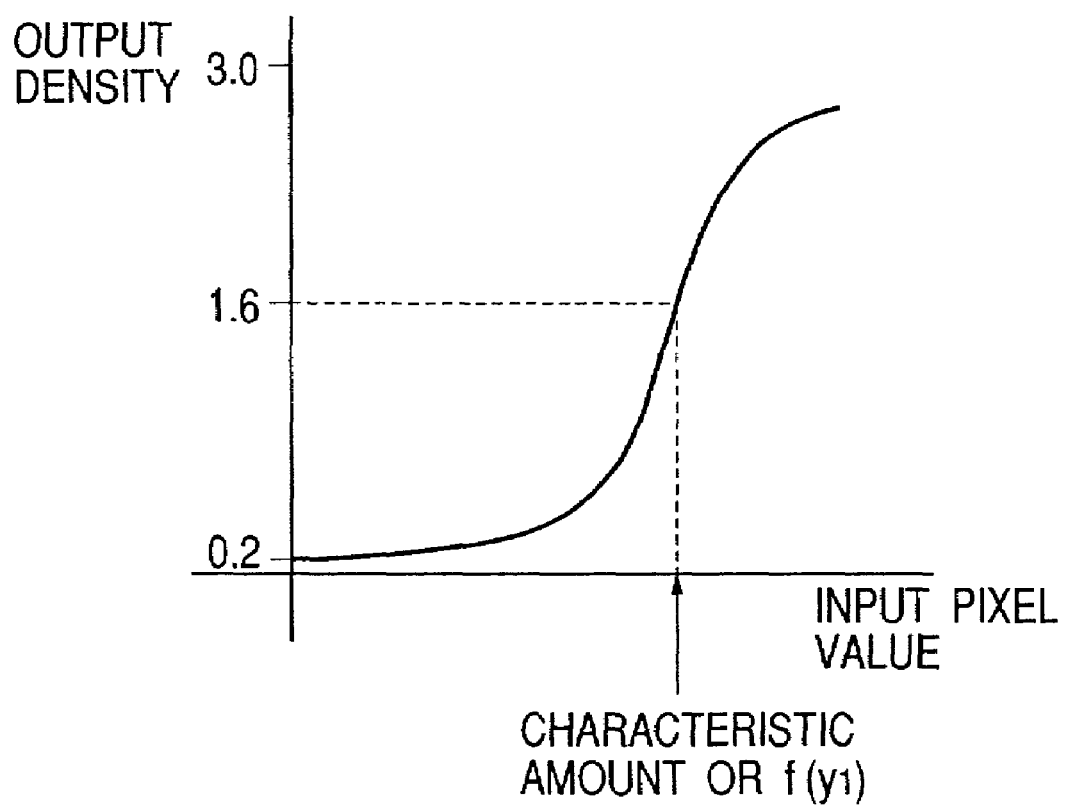
FIG. 26 is a graph showing a gradation conversion curve.

FIG. 24 is a flowchart showing the processing flow of the image processing device according to the sixth embodiment. FIG. 25A shows a cervical vertebra image, and FIG. 25B shows a result of calculation of the average pixel value in the horizontal axis direction of the image from which the passing through area of the cervical vertebra image of FIG. 25A is deleted. In FIG. 25B, ordinate indicates coordinate, and abscissa indicates the average pixel value. FIG. 26 shows a gradation conversion curve of the gradation converting circuit 2116, abscissa shows an input image value, and ordinate shows the output density after the gradation conversion.

The passing through extracting circuit 2111 having received the input image processed by the before-processing circuit 2106 via the CPU bus 2107 by the control of CPU 2108 calculates the maximum value of the input image, then determines threshold value Th1 based on the value (S2201). The value Th1 is, for example, a value of 90% of maximum pixel value of the entire image.

Subsequently, the passing through extracting circuit 2111 extracts the passing through area and the field area contacting the passing through area within a predetermined interval and replaces the area with a constant pixel value (e.g., pixel value of 0) according to equations (53), (54) (S2202).

$$f1(x, y) = f(x, y) \times \prod_{x1=-d1}^{x1=d1} \prod_{y1=-d2}^{y1=d2} sgn(x + x1, y + y1) \quad (53)$$

Here, f(x, y) indicates image data, and f1(x, y) indicates the image from which the passing through area and the field area contacting the passing through area within the constant interval are deleted. Moreover, sgn (x, y) is represented as follows, and d1 or d2 denotes a width to delete the field area, and is set based on an input image size. In this manner, the passing through area and the field area in contact within the constant interval are replaced with the constant pixel value. This is because X rays scattered from the passing through area could disturb the image and obstruct excellent characteristic extraction.

sgn(x, y)=0 when $f(x, y) \geq Th1$ sgn(x, y)=1 others $\quad (54)$

Subsequently, the average value extracting circuit 2112 calculates average value f(y) in y-axis coordinates in the image area (that is, image area indicating the field area) which cannot be replaced with 0 in the passing through extracting circuit 2111 according to equations (55), (56) (S2203).

For example, FIG. 25B shows the average value f(y) for the cervical vertebra image of FIG. 25A.

$$f(y) = \int_0^{Dx} f1(x, y) \times sgn2(f1(x, y)) dx \Big/ \int_0^{Dx} sgn2(f1(x, y)) dx \quad (55)$$

when $x = 0 \quad sgn2(x) = 0$ others $\quad sgn2(x) = 1 \quad (56)$

The position extracting circuit 2113 extracts coordinate y1 for the predetermined value of the average value f(y) calculated by the average value preparing circuit 2112. For example, in the embodiment the coordinate of the maximum value is obtained. The coordinate of maximum value f(y1) indicates the area of cervical vertebra in the input image, and maximum value f(y1) indicates the characteristic amount of cervical vertebra shown in the input image.

Based on the obtained maximum value f(y1) the set gradation converting conditions are used to perform gradation conversion on the input image in the gradation converting circuit 2116. For example, the gradation conversion is performed so that the maximum value f(y1) indicates a density value of 1.6 as shown in FIG. 26.

The average pixel value of the object area excluding the passing through area in the sixth embodiment indicates an area with good X-ray transmission and an area with poor X-ray transmission (here, the pixel value of the area with good X-ray transmission has a high pixel value). Therefore, for the average pixel value, for example, the portion (e.g., neck part) with good X-ray transmission such as the cervical vertebra image can easily be separated from the portion with poor transmission (e.g., head or shoulder part). Specifically, the portion of the noted area can easily be extracted (e.g., neck area) from the average pixel value.

Furthermore, since the average pixel value indicates the value representative of the noted area (e.g., the average pixel value of the neck area as the noted area), by setting gradation converting conditions based on the representative value, the density of the noted area can stably and favorably be converted.

Moreover, according to the method of the sixth embodiment, the passing through area is merely deleted and the average value is extracted. Therefore, since the portion indicating the maximum value or the minimum value of the average pixel value is unchanged even after the parallel movement or the rotating movement of the object, the noted area can stably be extracted.

(Seventh Embodiment)

Figure 27:
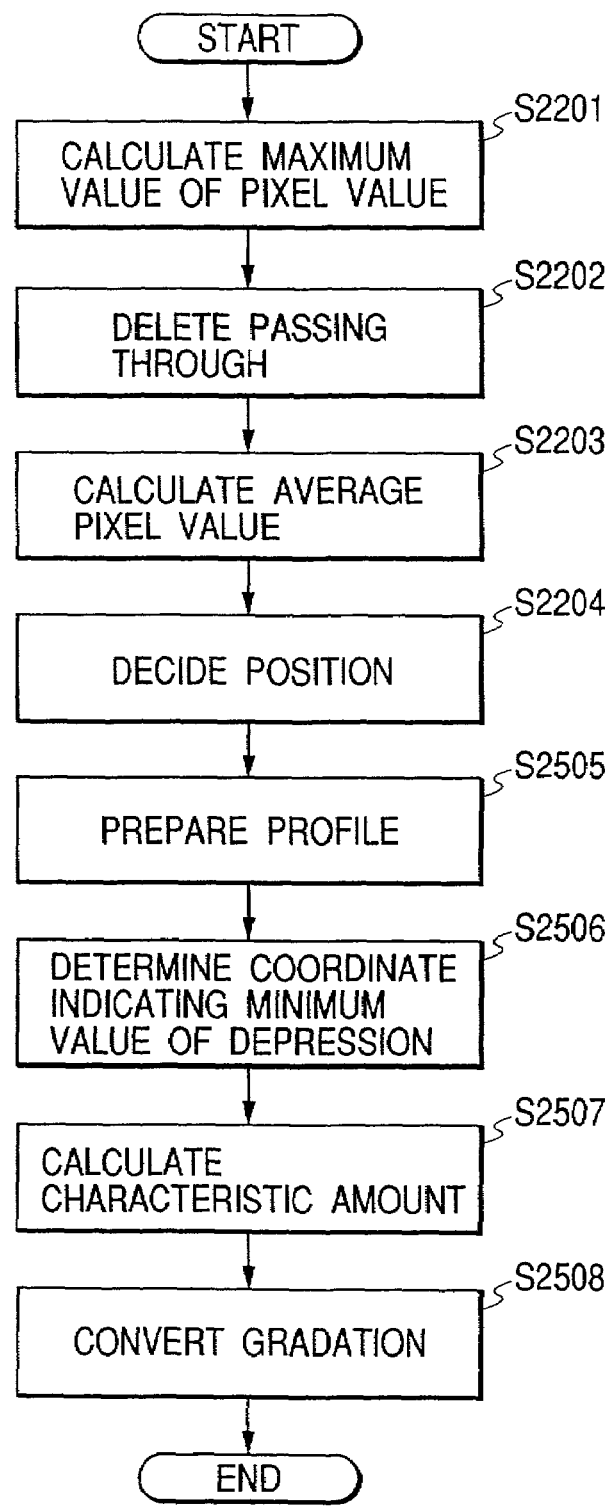
FIG. 27 is a flowchart showing a processing flow according to a seventh embodiment.
Figure 29:
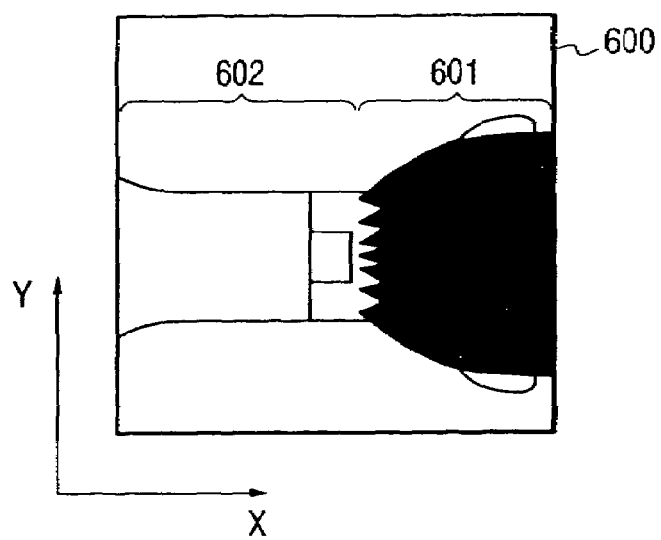
FIG. 29 is an explanatory view showing a conventional characteristic amount extracting method.
Figure 30:
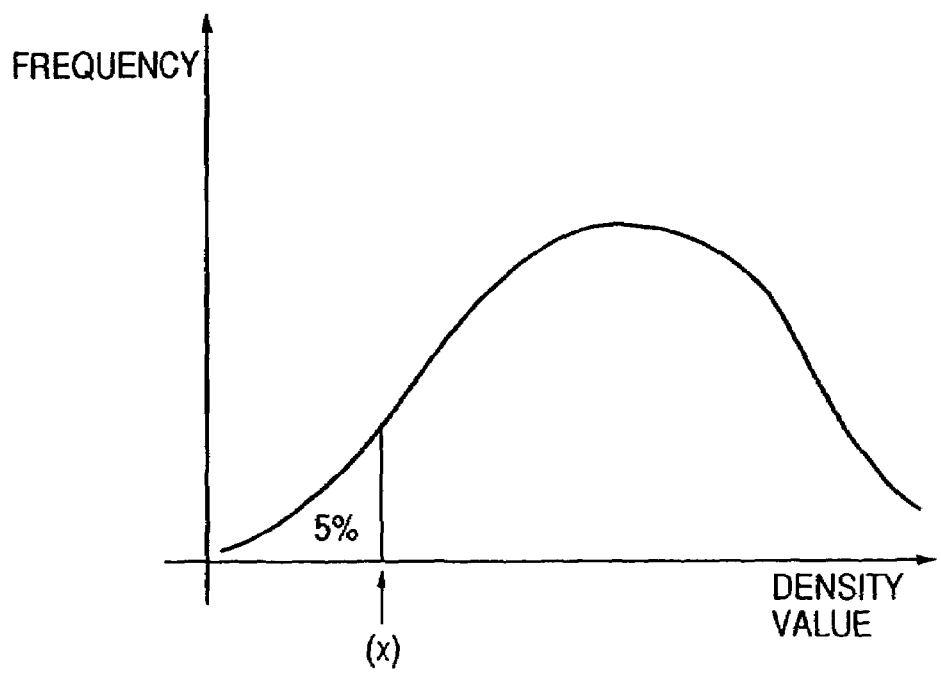
FIG. 30 is an explanatory view showing a histogram for use in the conventional characteristic amount extracting method.

FIG. 27 shows a processing flow of a seventh embodiment. FIG. 28A is a throratic spine side view, FIG. 28B is a diagram showing an average pixel value in y coordinates, and FIG. 28C is a diagram showing an average pixel value in x coordinates. The throratic spine refers to a spinal column area as the root of costa.

The processing flow of the seventh embodiment will be described with reference to FIG. 27. The same processings as those of the sixth embodiment are denoted with the same numerals, and the description thereof is omitted. Moreover, the embodiment can be applied to the X-ray photographing device in the same manner as the sixth embodiment.

According to the coordinate y1 determined by the position extracting circuit 2113, the analyzing circuit 2114 calculates profile f2(x)=f(x, y1) (S2505). Here, f(x, y) denotes the pixel value of the original image.

The analyzing circuit 1114 analyzes the profile to calculate the coordinate x1 for calculating the characteristic amount. For example, the x1 is used as the coordinate indicating the minimum value of the depression of the profile f2(x) (area a) (S2506). The bone area such as the throratic spine has a low X-ray transmittance, and the pixel value is lowered. Conversely, x1 may be used as the coordinate indicating the maximum value of the protrusion. In this case, the area with good X-ray transmittance such as a lung area is calculated (area b). Here, the depression or the protrusion may be judged from a height relation among three points on the profile.

Subsequently, the characteristic extracting circuit 2115 extracts the area determined by the coordinate y1 calculated by the position extracting circuit 2113 and the coordinate x1 calculated by the analyzing circuit 2114, for example, a four-side area having a predetermined width centering on x1, y1. Then, from areas a, b, the maximum value, the minimum value, the average value, and other statistical amounts are calculated as characteristic amounts (S2507). The predetermined width is set based on the input image size.

Subsequently, the gradation converting circuit 2116 performs gradation conversion based on the characteristic amount. For example, the average value of the area a calculated by the analyzing circuit 2114 is converted to a density value 1.2 or the like (S2508).

As described above, in the seventh embodiment, after the noted area is extracted in the sixth embodiment, analysis is further performed, so that a further detailed area (bone, lung, and other areas) can be extracted. Therefore, even when lung, bone, skin and other types of tissue are present, the areas can be extracted. Therefore, by performing the gradation conversion based on the characteristic amounts extracted in the areas (e.g., bone, lung, and other areas), the gradation conversion can be performed so that the bone, lung, and other areas which are to be observed can easily be observed.

Additionally, needless to say, the object of the present invention can also be attained by supplying storage medium in which the program code of software for realizing the function of a host computer and terminals of the above-described embodiments is stored to the system or the device, and reading and executing the program code stored in the storage medium by the computer (or CPU or MPU) of the system or the device.

In this case, the program code itself read from the storage medium realizes the function of each embodiment, and the storage medium in which the program code is stored constitutes the present invention.

As the storage medium for supplying the program code, a ROM, a floppy disk, a hard disk, an optical disk, an optomagnetic disk, a CD-ROM, a CD-R, a magnetic tape, a non-volatile memory card, and the like can be used.

By executing the program code read by the computer, the function of the embodiment can be realized. Additionally, based on the instruction of the program code, an OS or the like operating on the computer performs a part or the whole of an actual processing, and needless to say, the function of the embodiment is realized by the processing.

Furthermore, after the program code read from the storage medium is written into a memory disposed on a function expansion board inserted into the computer or a function expansion unit connected to the computer, based on the instruction of the program code, a CPU or the like disposed on the function expansion board or the function expansion unit performs a part or the whole of the actual processing, and needless to say, by the processing the function of the embodiment is realized.

What is claimed is:

1. A gradation conversion method for radiation image data of cervical vertebra radiographed by a radiation photographing apparatus, said method comprising the steps of:
  extracting an object area from the radiation image data;
  calculating added pixel values for each y-coordinate by scanning to add pixel values in the object area in an x-direction;
  calculating average pixel values for the y-coordinates, respectively, by dividing the added pixel values for the y-coordinate by a number of pixels corresponding to the added pixel values;
  determining a maximum value among the average pixel values for the y-coordinates, respectively; and converting a radiation value of the radiation image data by using a gradation conversion curve defined based on the maximum value.

2. A method according to claim 1,
wherein, in said extracting step, the object area is extracted based on an area through which radiation passes and an area adjacent thereto, and
wherein the adjacent area is within a given distance of the area through which radiation passes.

3. A method according to claim 1, further comprising the steps of:
irradiating the cervical vertebra with X-rays from an X-ray irradiating unit; and
converting radiation transmitted through the cervical vertebra into radiation image data using a two-dimensional sensor.

4. A storage medium storing a computer-readable program used to execute a gradation conversion method for radiation image data of cervical vertebra radiographed by a radiation photographing apparatus, wherein the program is comprised of:
code for extracting an object area from the radiation image data;
code for calculating added pixel values for each y-coordinate by scanning to add pixel values in the object area in an x-direction;
code for calculating average pixel values for the y-coordinates, respectively, by dividing the added pixel values for the y-coordinate by a number of pixels corresponding to the added pixel values;
code for determining a maximum value among the average pixel values for the y-coordinates, respectively; and
code for converting a radiation value of the radiation image data by using a gradation conversion curve defined by the code for the maximum value determining step.

5. A gradation conversion method for radiation image data of cervical vertebra radiographed by a radiation photographing apparatus, said method comprising the steps of:
extracting an object area from the radiation image data;
calculating added pixel values for each y-coordinate by scanning to add pixel values in the object area in an x-direction;
calculating average pixel values for the y-coordinates, respectively, by dividing the added pixel values for the y-coordinate by a number of pixels corresponding to the added pixel values;

determining a maximum value among the average pixel values for the y-coordinates, respectively;
determining an x-coordinate showing an area of the cervical vertebra by using pixel values of pixels where an average pixel value at a y-coordinate of the pixels is a maximum value;
calculating a statistic from an area determined by the x- and y-coordinates; and
converting a radiation value of the radiation image data by using a gradation conversion curve defined based on the statistic.

6. A method according to claim 5, wherein the statistic is a maximum value, a minimum value, or an average value.

7. A storage medium storing a computer-readable program used to execute a gradation conversion method for radiation image data of cervical vertebra radiographed by a radiation photographing apparatus, wherein the program is comprised of:
code for extracting an object area from the radiation image data;
code for calculating added pixel values for each y-coordinate by scanning to add pixel values in the object area in an x-direction;
code for calculating average pixel values for the y-coordinates, respectively, by dividing the added pixel values for the y-coordinate by a number of pixels corresponding to the added pixel values;
code for determining a maximum value among the average pixel values for the y-coordinates, respectively;
code for determining an x-coordinate showing an area of the cervical vertebra by using pixel values of pixels where an average pixel value at a y-coordinate of the pixels is a maximum value;
code for calculating a statistic from an area determined by the x- and y-coordinates; and
code for converting a radiation value of the radiation image data by using a gradation conversion curve defined by the code for calculating the statistic.

8. A storage medium according to claim 7, wherein the statistic is a maximum value, a minimum value, or an average value.

* * * * *

UNITED STATES PATENT AND TRADEMARK OFFICE
CERTIFICATE OF CORRECTION

| | |
|---|---|
| PATENT NO. | : 7,013,035 B2 |
| APPLICATION NO. | : 09/405176 |
| DATED | : March 14, 2006 |
| INVENTOR(S) | : Hiroyuki Shinbata |

It is certified that error appears in the above-identified patent and that said Letters Patent is hereby corrected as shown below:

COLUMN 1

Line 60, "of" should read --of a--.

COLUMN 4

Line 21, "of" (third occurrence) should read --of a--.
    Line 28, "part (in" should read --part, in--.
    Line 32, "formula)." should read --formula.--

COLUMN 6

Line 42, "a" should read --as--.

COLUMN 7

Line 7, "and" should read --and the--.

COLUMN 12

Line 12, "of" should read --of the--.

COLUMN 16

Line 10, "the neck" should be deleted.
    Line 11, "both" should read --both neck--.
    Line 13, "are" should read --is--.

COLUMN 17

Line 63, "circuit 1106" should read --circuit 2106--.

UNITED STATES PATENT AND TRADEMARK OFFICE
CERTIFICATE OF CORRECTION

| | |
|---|---|
| PATENT NO. | : 7,013,035 B2 |
| APPLICATION NO. | : 09/405176 |
| DATED | : March 14, 2006 |
| INVENTOR(S) | : Hiroyuki Shinbata |

It is certified that error appears in the above-identified patent and that said Letters Patent is hereby corrected as shown below:

COLUMN 20

Line 24, "supplying" should read --supplying a--.

Signed and Sealed this

Tenth Day of July, 2007

JON W. DUDAS
*Director of the United States Patent and Trademark Office*